US010875275B2

(12) United States Patent
Yoshioka et al.

(10) Patent No.: US 10,875,275 B2
(45) Date of Patent: Dec. 29, 2020

(54) COMPOSITION FOR FORMING SEPARATION LAYER, SUPPORT BASE PROVIDED WITH SEPARATION LAYER, LAMINATE AND METHOD OF PRODUCING SAME, AND METHOD OF PRODUCING ELECTRONIC COMPONENT

(71) Applicant: TOKYO OHKA KOGYO CO., LTD., Kawasaki (JP)

(72) Inventors: Takahiro Yoshioka, Kawasaki (JP); Hirofumi Imai, Kawasaki (JP); Hiroaki Takeuchi, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 171 days.

(21) Appl. No.: 16/051,727

(22) Filed: Aug. 1, 2018

(65) Prior Publication Data
US 2019/0047250 A1 Feb. 14, 2019

(30) Foreign Application Priority Data

Aug. 10, 2017 (JP) .................. 2017-156061
Jun. 25, 2018 (JP) .................. 2018-120191

(51) Int. Cl.
B32B 7/06 (2019.01)
B32B 27/42 (2006.01)
B32B 7/12 (2006.01)
B32B 38/00 (2006.01)

(52) U.S. Cl.
CPC ............... B32B 7/06 (2013.01); B32B 7/12 (2013.01); B32B 27/42 (2013.01); B32B 38/0012 (2013.01); *B32B 2038/0052* (2013.01); *B32B 2307/412* (2013.01); *B32B 2457/14* (2013.01)

(58) Field of Classification Search
None
See application file for complete search history.

(56) References Cited

U.S. PATENT DOCUMENTS

2005/0233547 A1 10/2005 Noda et al.
2012/0118511 A1* 5/2012 Imai .................. B32B 38/10
156/712
2016/0332421 A1* 11/2016 Yoshioka ............ B32B 7/06

FOREIGN PATENT DOCUMENTS

JP A-2004-064040 A 2/2004

* cited by examiner

*Primary Examiner* — Anish P Desai
(74) *Attorney, Agent, or Firm* — Knobbe Martens Olson & Bear LLP

(57) ABSTRACT

A composition for forming a separation layer that separates a support base that transmits light from a laminate including the support base, a substrate, the separation layer and an adhesive layer between the support base and the substrate by irradiating the separation layer with light from the support base side and modifying the separation layer. The composition contains a resin component which has a phenol skeleton.

8 Claims, 5 Drawing Sheets

COMPOSITION FOR FORMING SEPARATION LAYER, SUPPORT BASE PROVIDED WITH SEPARATION LAYER, LAMINATE AND METHOD OF PRODUCING SAME, AND METHOD OF PRODUCING ELECTRONIC COMPONENT

BACKGROUND OF THE INVENTION

Field of the Invention

The present invention relates to a composition for forming a separation layer, a support base provided with a separation layer, a laminate and a method of producing the same, and a method of producing an electronic component.

Priority is claimed on Japanese Patent Application No. 2017-156061, filed on Aug. 10, 2017, and Japanese Patent Application No. 2018-120191, filed on Jun. 25, 2018, the contents of which are incorporated herein by reference.

Description of Related Art

There are various forms of a semiconductor package (electronic component) including a semiconductor element according to the corresponding size, and examples thereof include a wafer level package (WLP) and a panel level package (PLP).

As a technology of a semiconductor package, a fan-in technology and a fan-out technology are exemplified. As a semiconductor package obtained according to a fan-in technology, a fan-in wafer level package (WLP) that rearranges a terminal of a bare chip terminal in a chip area has been known. As a semiconductor package obtained according to a fan-out technology, a fan-out wafer level package (WLP) that rearranges the terminal outside the chip area has been known.

In recent years, particularly the fan-out technology is applied to a fan-out panel level package (PLP) in which a semiconductor element is disposed on a panel and packaged. As in this application, the fan-out technology has been attracting attention as a method that enables realization of higher integration, further reduction in thickness, and further miniaturization in a semiconductor package.

In order to attempt miniaturization of a semiconductor package, it is important to reduce the thickness of a substrate in an element to be incorporated. However, in a case where the thickness of a substrate is reduced, the strength thereof is decreased and damage to the substrate is likely to occur during the manufacture of a semiconductor package. For this reason, a laminate obtained by bonding a support base to the substrate is employed.

Patent Literature 1 discloses a method of producing a laminate by bonding a light-transmitting support base to a substrate through a light heat converting layer (separation layer) and an adhesive layer provided on the support base side, processing the substrate, and irradiating the separation layer with radiant energy (light) from the support base side so that the separation layer is modified and decomposed to separate the processed substrate and the support base from each other.

DOCUMENTS OF RELATED ART

Patent Literature

[Patent Literature 1] Japanese Unexamined Patent Application Publication No. 2004-64040

SUMMARY OF THE INVENTION

In a case where miniaturization of a semiconductor package is attempted by employing a laminate obtained by bonding a support base to a substrate as described in Patent Literature 1, the separability of the support base from the laminate becomes problematic.

The present invention has been made in consideration of the above-described circumstances, and an object thereof is to provide a composition for forming a separation layer which is capable of forming a separation layer provided in a laminate including a support base, a substrate, and the separation layer between the support base and the substrate, wherein the photoreactivity of the separation layer is increased so that the separability of the support base from the laminate is improved; a support base provided with a separation layer; a laminate; a method of producing the laminate, and a method of producing an electronic component.

In order to solve the above-described problems, the following configurations are employed by the present invention.

Specifically, according to a first aspect of the present invention, there is provided a composition for forming a separation layer, the composition including a resin component (P) which has a phenol skeleton, wherein the separation layer is provided in a laminate including a support base which transmits light, a substrate, and the separation layer between the support base and the substrate, wherein the separation layer is modifiable by irradiation of light from the support base side of the laminate, so as to render the support base separable from the laminate.

According to a second aspect of the present invention, there is provided a support base provided with a separation layer, including: a support base; and a separation layer formed on the support base, the separation layer being formed of the composition for forming a separation layer according to the first aspect.

According to a third aspect of the present invention, there is provided a laminate including: a support base which transmits light; a substrate; and a separation layer between the support base and the substrate, in which the separation layer is a baked substance of the composition for forming a separation layer according to the first aspect.

According to a fourth aspect of the present invention, there is provided a method of producing a laminate including a support base that transmits light, a substrate, and a separation layer between the support base and the substrate, the method including: forming the separation layer by coating at least one of the substrate and the support base with the composition for forming a separation layer according to the first aspect; baking the composition; and laminating the substrate and the support base with the separation layer interposed therebetween.

According to a fifth aspect of the present invention, there is provided a method of producing an electronic component including: producing a laminate by the method according to the fourth aspect; separating the support base from the laminate by irradiating the separation layer with light through the support base and modifying the separation layer; and removing the separation layer adhered to the substrate, after separating the support base from the laminate.

According to the present invention, it is possible to provide a composition for forming a separation layer which is capable of forming a separation layer provided in a laminate including a support base, a substrate, and the separation layer between the support base and the substrate, wherein the photoreactivity of the separation layer is increased so that the separability of the support base from the laminate is improved; a support base provided with a separation layer; a laminate; a method of producing the laminate; and a method of producing an electronic component.

BRIEF DESCRIPTION OF THE DRAWINGS

FIG. 2A is a view for describing a separation layer formation step, and FIG. 2B is a view for describing a lamination step.

FIG. 3A is a view illustrating a laminate produced by a production method according to a first embodiment, and FIG. 3B is a view for describing an encapsulation step.

FIG. 4A is a view illustrating an encapsulated body produced by a production method according to a second embodiment, FIG. 4B is a view for describing a grind step, and FIG. 4C is a view for describing a rewiring formation step.

FIG. 5A is a view illustrating a laminate produced by a production method according to a third embodiment, FIG. 5B is a view for describing a separation step, and FIG. 5C is a view for describing a removal step.

FIG. 6A is a schematic view illustrating another embodiment of a laminate to which the present invention has been applied, FIG. 6B is a view for describing a separation step, and FIG. 6C is a view for describing a removal step.

DETAILED DESCRIPTION OF THE INVENTION

Figure 1:
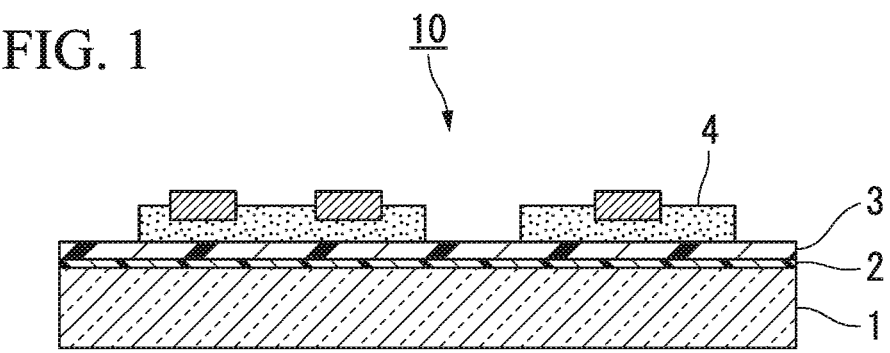
FIG. 1 is a schematic view illustrating an embodiment of a laminate to which the present invention has been applied.

In the present specification and claims, the term "aliphatic" is a concept relative to aromatic and means a group or a compound that does not have aromaticity, or the like.

The concept of "alkyl group" includes a linear, branched, or cyclic monovalent saturated hydrocarbon group unless otherwise noted. The same applies to an alkyl group in an alkoxy group.

The concept of "alkylene group" includes a linear, branched, or cyclic divalent saturated hydrocarbon group unless otherwise noted.

A "halogenated alkyl group" indicates a group formed by some or all hydrogen atoms in an alkyl group being substituted with halogen atoms, and examples of the halogen atoms include a fluorine atom, a chlorine atom, a bromine atom, and an iodine atom.

A "fluorinated alkyl group" or a "fluorinated alkylene group" indicates a group formed by some or all hydrogen atoms in an alkyl group or an alkylene group being substituted with fluorine atoms.

A "constitutional unit" indicates a monomer unit constituting a polymer compound (a resin, a polymer, or a copolymer).

The description of "may have a substituent" includes a case where a hydrogen atom (—H) is substituted with a monovalent group and a case where a methylene group (—CH$_2$—) is substituted with a divalent group.

The concept of "exposure" includes general irradiation with radiation.

A "constitutional unit derived from hydroxystyrene derivative" indicates a constitutional unit formed by an ethylenic double bond of hydroxystyrene being cleaved. A "constitutional unit derived from a hydroxystyrene derivative" indicates a constitutional unit formed by an ethylenic double bond of a hydroxystyrene derivative being cleaved.

A "hydroxystyrene derivative" indicates a derivative formed by a hydrogen atom at the α-position of hydroxystyrene being substituted with another substituent such as an alkyl group or a halogenated alkyl group, and the concept of the "hydroxystyrene derivative" includes these derivatives. Examples of these derivatives include a derivative formed by a hydrogen atom of a hydroxyl group of hydroxystyrene, in which a hydrogen atom at the α-position may be substituted with a substituent, being substituted with an organic group; and a derivative formed by a substituent other than a hydroxyl group being bonded to a benzene ring of hydroxystyrene in which a hydrogen atom at the α-position may be substituted with a substituent. Further, the α-position (carbon atom at the α-position) indicates a carbon atom to which a benzene ring is bonded unless otherwise noted.

Examples of the substituent that substitutes for a hydrogen atom at the α-position of hydroxystyrene are the same as those described as examples of the substituent at the α-position in the α-substituted acrylic acid ester.

The concept of "styrene" includes those formed by hydrogen atoms in styrene and the α-position of styrene being substituted with other substituents such as an alkyl group and a halogenated alkyl group.

A "styrene derivative" indicates a derivative formed by a hydrogen atom at the α-position of styrene being substituted with another substituent such as an alkyl group or a halogenated alkyl group, and the concept of the "styrene derivative" includes these derivatives. Examples of these derivatives include those formed by a substituent being bonded to a benzene ring of hydroxystyrene in which a hydrogen atom at the α-position may be substituted with a substituent. Further, the α-position (carbon atom at the α-position) indicates a carbon atom to which a benzene ring is bonded unless otherwise noted.

A "constitutional unit derived from styrene" or a "constitutional unit derived from a styrene derivative" indicates a constitutional unit formed by an ethylenic double bond of styrene or a styrene derivative being cleaved.

As the alkyl group as a substituent at the α-position, a linear or branched alkyl group is preferable, and specific examples thereof include an alkyl group having 1 to 5 carbon atoms (such as a methyl group, an ethyl group, a propyl group, an isopropyl group, an n-butyl group, an isobutyl group, a tert-butyl group, a pentyl group, an isopentyl group, or a neopentyl group).

Further, specific examples of the halogenated alkyl group as a substituent at the α-position include groups formed by some or all hydrogen atoms in the "alkyl group as a substituent at the α-position" being substituted with halogen atoms. Examples of the halogen atoms include a fluorine atom, a chlorine atom, a bromine atom, and an iodine atom. Among these, a fluorine atom is particularly preferable.

In addition, specific examples of the hydroxyalkyl group as a substituent at the α-position include groups formed by some or all hydrogen atoms in the "alkyl group as a substituent at the α-position" being substituted with hydroxyl groups. The number of hydroxyl groups in the hydroxyalkyl group is preferably in a range of 1 to 5 and most preferably 1.

(Composition for Forming Separation Layer)

A composition for forming a separation layer according to a first embodiment of the present invention is used for forming a separation layer provided in a laminate including a support base which transmits light, a substrate, and the separation layer between the support base and the substrate, wherein the separation layer is modifiable by irradiation of light from the support base side of the laminate, so as to render the support base separable from the laminate.

The composition for forming a separation layer of the present embodiment contains at least a resin component (P) which has a phenol skeleton.

FIG. 1 illustrates an embodiment of a laminate to which the present invention has been applied.

A laminate 10 illustrated in FIG. 1 includes a separation layer 2 and an adhesive layer 3 between a support base 1 and a substrate 4, and the separation layer 2, the adhesive layer 3, and the substrate 4 are laminated on the support base 1 in this order.

The support base 1 is formed of a material that transmits light. In the laminate 10, since the separation layer 2 is modified and decomposed by irradiating the separation layer 2 with light from the support base 1 side, the support base 1 is separated from the laminate 10.

The separation layer 2 in this laminate 10 can be formed using the composition for forming a separation layer according to the present embodiment.

<Resin Component (P)>

The resin component (P) (hereinafter, also referred to as "(P) component") is a resin component having a phenol skeleton.

The expression "having a phenol skeleton" here means that the resin component has a hydroxybenzene structure.

(P) component has a film forming ability and a molecular weight of preferably 1000 or greater. In a case where the molecular weight of (P) component is 1000 or greater, the film forming ability is improved. The molecular weight of (P) component is more preferably in a range of 1000 to 30000, still more preferably in a range of 1500 to 20000, and particularly preferably in a range of 2000 to 15000.

In a case where the molecular weight of (P) component is less than or equal to the upper limit of the above-described preferable range, the solubility of the composition for forming a separation layer in a solvent is increased.

As the molecular weight of the resin component, a weight-average molecular weight (Mw) in terms of polystyrene according to gel permeation chromatography (GPC) is used.

Further, in a case where (P) component has a phenol skeleton, (P) component is easily modified (oxidized or the like) by being heated or the like so that the photoreactivity is increased. Further, (P) component is decomposed by heat generated due to light absorption. Accordingly, in the laminate 10, the separation layer 2 is modified by irradiation with light from the support base 1 side and is delaminated from the substrate 4, and thus the support base 1 is separated.

(P) component is not particularly limited as long as (P) component has a phenol skeleton, and examples thereof include a novolak type phenol resin, a resol type phenol resin, a hydroxystyrene resin, a hydroxyphenylsilsesquioxane resin, a hydroxybenzylsilsesquioxane resin, a phenol skeleton-containing acrylic resin, and a resin having a repeating unit represented by Formula (P2). Among these, a novolak type phenol resin, a resol type phenol resin, and a resin having a repeating unit represented by Formula (P2) are more preferable.

In particular, in terms of suppressing occurrence of voids due to heat, (P) component preferably contains a novolak type phenol resin. Alternatively, in terms of improving chemical resistance, (P) component preferably contains a resin having a repeating unit represented by Formula (P2).

<<Novolak Type Phenol Resin>>

As a novolak type phenol resin (hereinafter, also referred to as a "resin (P1)") which can be used as (P) component, for example, a phenol resin having an m-cresol repeating unit (u11) and a p-cresol repeating unit (u12) as main components is suitably used.

The "phenol resin having an m-cresol repeating unit (u11) and a p-cresol repeating unit (u12) as main components" indicates a phenol resin in which the total proportion of the repeating unit (u11) and the repeating unit (u12) in all repeating units which constitute the phenol resin and are derived from phenols is 50% by mole or greater. The total proportion thereof is preferably 80% by mole or greater, more preferably in a range of 80% to 100% by mole, and particularly preferably 100% by mole.

In the resin (P1), the mixing ratio (molar ratio) (repeating unit (u11)/repeating unit (u12)) between the repeating unit (u11) and the repeating unit (u12) is preferably in a range of 2/8 to 9/1, more preferably in a range of 3/7 to 7/3, and still more preferably in a range of 4/6 to 6/4.

In a case where the mixing ratio thereof in the resin (P1) is in the above-described preferable range, the photoreactivity of the separation layer is further increased. In addition, the chemical resistance is also increased.

Here, the mixing ratio (molar ratio) thereof in the resin (P1) indicates the mixing ratio (molar ratio) between the m-cresol repeating unit (u11) and the p-cresol repeating unit (u12) in the novolak type phenol resin after production.

The resin (P1) may have other repeating units in addition to the repeating unit (u11) and the repeating unit (u12).

In a case where the resin (P1) has other repeating units, other repeating units in the resin (P1) may be one or two or more kinds thereof.

As other repeating units, repeating units derived from phenols other than m-cresol and p-cresol are exemplified, and examples thereof include phenol, and o-cresol; xylenols such as 2,3-xylenol, 2,5-xylenol, 2,6-xylenol, 3,5-xylenol, and 3,4-xylenol; alkylphenols such as m-ethylphenol, p-ethylphenol, o-ethylphenol, 2,3,5-trimethylphenol, 2,4,6-trimethylphenol, 2,3,5-triethylphenol, 4-tert-butylphenol, 3-tert-butylphenol, 2-tert-butylphenol, 2-tert-butyl-4-methylphenol, and 2-tert-butyl-5-methylphenol; alkoxyphenols such as p-methoxyphenol, m-methoxyphenol, p-ethoxyphenol, m-ethoxyphenol, p-propoxyphenol, and m-propoxyphenol; isopropenylphenols such as o-isopropenylphenol, p-isopropenylphenol, 2-methyl-4-isopropenylphenol, and 2-ethyl-4-isopropenylphenol; arylphenols such as phenylphenol; polyhydroxyphenols such as 4,4'-dihydroxybiphenyl, bisphenol A, resorcinol, hydroquinone, pyrogallol; 1-naphthol, and 2-naphthol.

The content ratio of the resin (P1) in (P) component is appropriately set according to the required characteristics, and preferably 5% by mass or greater, more preferably 10% by mass or greater, still more preferably 20% by mass or greater, and may be 100% by mass.

The resin (P1) can be obtained by reacting, for example, m-cresol, p-cresol, and aldehydes in the presence of an acid catalyst.

In such a reaction, by controlling the charging ratio of m-cresol and p-cresol, a novolak type phenol resin having the repeating unit (u11) and the repeating unit (u12) at a predetermined mixing ratio can be produced.

Such a reaction can be performed in the presence of an acid catalyst according to a known method. As the acid catalyst, for example, hydrochloric acid, sulfuric acid, formic acid, oxalic acid, or p-toluenesulfonic acid can be used.

Examples of the aldehydes include formaldehyde, p-formaldehyde, trioxane, acetaldehyde, propionaldehyde, butylaldehyde, trimethylacetaldehyde, acrolein, crotonaldehyde, cyclohexanealdehyde, furfural, furylacrolein, benzaldehyde, terephthalaldehyde, phenylacetaldehyde, α-phenylpropylaldehyde, β-phenylpropylaldehyde, o-hydroxybenzaldehyde, m-hydroxybenzaldehyde, p-hydroxybenzaldehyde, o-methylbenzaldehyde, m-methylbenzaldehyde, p-methylbenzaldehyde, o-chlorobenzaldehyde, m-chlorobenzaldehyde, p-chlorobenzaldehyde, cinnamaldehyde, and salicylaldehyde. Among these, formaldehyde or salicylaldehyde is preferable. From the viewpoint of imparting heat resistance, salicylaldehyde is preferable.

The aldehydes may be used alone or in combination of two or more kinds thereof.

From the viewpoint of decreasing the baking temperature or suppressing occurrence of voids, for example, a phenol resin having a naphthol repeating unit and a phenol repeating unit as main components is suitably used as the resin (P1). This phenol resin can be obtained by reacting naphthol, phenol, and aldehydes in the presence of an acid catalyst.

The weight-average molecular weight (Mw) of the resin (P1) is preferably in a range of 1000 to 30000, more preferably in a range of 1500 to 20000, and particularly preferably in a range of 2000 to 15000.

In a case where the Mw of the resin (P1) is greater than or equal to the lower limit of the above-described preferable range, the film forming ability is improved. Further, in a case where the Mw thereof is less than or equal to the upper limit of the above-described preferable range, the solubility of the composition for forming a separation layer in a solvent is increased.

<<Resol Type Phenol Resin>>

The weight-average molecular weight (Mw) of the resol type phenol resin which can be used as (P) component is preferably in a range of 500 to 10000, more preferably in a range of 500 to 5000, and particularly preferably in a range of 1000 to 2000.

In a case where the Mw of the resol type phenol resin is greater than or equal to the lower limit of the above-described preferable range, the film forming ability is improved. Further, in a case where the Mw thereof is less than or equal to the upper limit of the above-described preferable range, the solubility of the composition for forming a separation layer in a solvent is increased.

<<Resin (P2)>>

A resin (P2) is a resin having a repeating unit represented by Formula (P2).

[Chemical Formula 1]

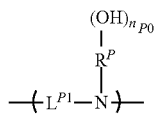

(P2)

[In the formula, $L^{P1}$ represents a divalent linking group. $R^P$ represents an $(n_{P0}+1)$-valent aromatic hydrocarbon group. $n_{P0}$ represents an integer of 1 to 3.]

In Formula (P2), $L^{P1}$ represents a divalent linking group and preferably a divalent linking group having a heteroatom. From the viewpoint of imparting desired characteristics, a linking group into which various skeletons are introduced is exemplified as $L^{P1}$.

In Formula (P2), $R^P$ represents an $(n_{P0}+1)$-valent aromatic hydrocarbon group.

Examples of the aromatic hydrocarbon group as $R^P$ include a group obtained by removing $(n_{P0}+1)$ hydrogen atoms from an aromatic ring. Here, the aromatic ring is not particularly limited as long as the aromatic ring has a cyclic conjugated system having $4n+2\pi$ electrons and may be monocyclic or polycyclic. The number of carbon atoms of the aromatic ring is preferably in a range of 5 to 30, more preferably in a range of 5 to 20, still more preferably in a range of 6 to 15, and particularly preferably in a range of 6 to 12. Specific examples of the aromatic ring include an aromatic hydrocarbon ring such as benzene, naphthalene, anthracene, or phenanthrene; and an aromatic heterocycle obtained by substituting some carbon atoms constituting the aromatic hydrocarbon ring with heteroatoms. Examples of the heteroatom in the aromatic heterocycle include an oxygen atom, a sulfur atom, and a nitrogen atom. Specific examples of the aromatic heterocycle include a pyridine ring and a thiophene ring.

Further, examples of the aromatic hydrocarbon group as $R^P$ include a group formed by removing $(n_{P0}+1)$ hydrogen atoms from an aromatic compound (such as biphenyl or fluorene) having two or more aromatic rings.

In Formula (P2), $n_{P0}$ represents an integer of 1 to 3, preferably 1 or 2, and particularly preferably 1.

The hydroxyl group content ratio of the resin (P2) with respect to the total amount (100% by mass) of the resin (P2) is preferably 1% by mass or greater, more preferably in a range of 5% to 50% by mass, and still more preferably in a range of 5% to 20% by mass.

In a case where the hydroxyl group content ratio of the resin (P2) is greater than or equal to the lower limit of the above-described preferable range, oxidation is further promoted by baking during formation of the separation layer. Further, in a case where the hydroxyl group content ratio thereof is less than or equal to the upper limit of the above-described preferable range, the solubility of the composition for forming a separation layer in a solvent is increased.

As the repeating unit represented by Formula (P2), a repeating unit represented by Formula (P2-1) is suitably exemplified.

[Chemical Formula 2]

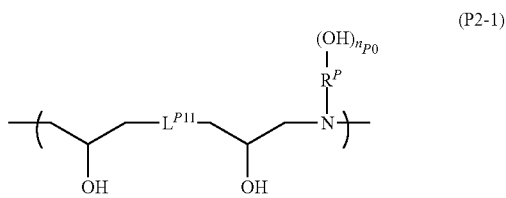

(P2-1)

[In the formula, $L^{P11}$ represents a divalent linking group. $R^P$ represents an $(n_{P0}+1)$-valent aromatic hydrocarbon group. $n_{P0}$ represents an integer of 1 to 3.]

In Formula (P2-1), $L^{p11}$ represents a divalent linking group, and various skeletons are introduced into the linking group according to the desired characteristics.

Examples of $L^{p11}$ include an ether bonding group of bisphenols, an ether bonding group of diols, an ester bonding group of dicarboxylic acids, a Si—O bonding group, and a repeated structure of any of these bonding groups.

Examples of the bisphenols include bisphenol F, bisphenol A, bisphenol Z, biphenol, and a polymer of these.

Examples of the diols include ethylene glycol, propylene glycol, 1,6-hexanediol, neopentyl glycol, and a polymer of any of these diols.

Examples of the dicarboxylic acids include maleic acid, phthalic acid, hydrogenated phthalic acid, and terephthalic acid.

In a case where an ether bonding group of bisphenols is selected as $L^{p11}$, the flexibility of a film made of the resin (P2) is likely to be improved.

In a case where an ether bonding group of diols is selected as $L^{p11}$, alkali solubility of the resin (P2) is easily adjusted. Examples of the glycol skeleton include a propylene glycol skeleton.

In a case where a Si—O bond is selected as $L^{p11}$, the dielectric constant of a resin (P2) formed product is likely to be lowered.

The content ratio of the resin (P2) in (P) component is appropriately set according to the required characteristics, and preferably 10% by mass or greater, more preferably 20% by mass or greater, still more preferably 30% by mass or greater, and may be 100% by mass.

The weight-average molecular weight (Mw) of the resin (P2) is preferably in a range of 1000 to 30000, more preferably in a range of 1500 to 25000, and particularly preferably in a range of 2000 to 20000.

In a case where the Mw of the resin (P2) is greater than or equal to the lower limit of the above-described preferable range, the film forming ability is improved. Further, in a case where the Mw thereof is less than or equal to the upper limit of the above-described preferable range, the solubility of the composition for forming a separation layer in a solvent is increased.

As the resin (P2), for example, GSP Series (manufactured by Gun Ei Chemical Industry Co., Ltd.) such as GSP-01, GSP-02, and GSP-03 (all trade names) can be used.

Alternatively, a resin generated by reacting aminophenols, aminonaphthols, or anilines with a compound containing two epoxy groups in one molecule can be used as the resin (P2).

Examples of the aminophenols include 2-aminophenol, 3-aminophenol, 4-aminophenol, 4-amino-3-methylphenol, 2-amino-4-methylphenol, 3-amino-2-methylphenol, and 5-amino-2-methylphenol. Examples of the aminonaphthols include 1-amino-2-naphthols, 3-amino-2-naphthols, and 5-amino-1-naphthols.

Examples of the compound containing two epoxy groups in one molecule include bisphenol type epoxy resins such as EPICLON 850 and EPICLON 830 (both trade names, manufactured by DIC Corporation), and jERYX-4000 (manufactured by Mitsubishi Chemical Corporation); diol type epoxy resins such as DENACOL EX-211, DENACOL EX-212, DENACOL EX-810, DENACOL EX-830, DENACOL EX-911, DENACOL EX-920, and DENACOL EX-930 (manufactured by Nagase ChemteX Corporation); dicarboxylic acid ester type epoxy resins such as DENACOL EX-711 and DENACOL EX-721 (both manufactured by Nagase ChemteX Corporation), and jER191P (manufactured by Mitsubishi Chemical Corporation); and silicone type epoxy resins such as X-22-163 and KF-105 (manufactured by Shin-Etsu Chemical Co., Ltd.).

The temperature of the heating treatment during such a reaction is preferably in a range of 60° C. to 250° C. and more preferably in a range of 80° C. to 180° C.

(P) component contained in the composition for forming a separation layer according to the present embodiment may be one or two or more kinds thereof.

As (P) component, one or more selected from the group consisting of the resin (P1) and the resin (P2) described above is preferable, and a combination of the resin (P1) and the resin (P2) according to the required characteristics can be used as appropriate.

During the formation of the separation layer, for example, the effect of suppressing occurrence of voids is improved as the content ratio of the resin (P1) in (P) component is increased. The content ratio of the resin (P1) with respect to 100% by mass of (P) component is preferably 5% by mass or greater, more preferably 10% by mass or greater, still more preferably 20% by mass or greater, still more preferably 30% by mass or greater, and still more preferably 50% by mass or greater.

During the formation of the separation layer, for example, the chemical resistance is improved as the content ratio of the resin (P2) in (P) component is increased. The content ratio of the resin (P2) with respect to 100% by mass of (P) component is preferably 50% by mass or greater, more preferably 70% by mass or greater, still more preferably 80% by mass or greater, and particularly preferably 90% by mass or greater.

The content of (P) component in the composition for forming a separation layer according to the present embodiment may be adjusted according to the thickness or the like of the separation layer intended to be formed.

The content of (P) component in the composition for forming a separation layer is preferably in a range of 1% to 100% by mass, more preferably in a range of 5% to 50% by mass, and still more preferably in a range of 10% to 40% by mass with respect to the content (100% by mass) of the composition.

In a case where the content of (P) component is greater than or equal to the lower limit of the above-described preferable range, the photoreactivity of the separation layer is likely to be increased. In addition, the chemical resistance is likely to be improved. Further, in a case where the content thereof is less than or equal to the upper limit of the above-described preferable range, the photoreactivity and release properties are likely to be increased.

<Other Components>

The composition for forming a separation layer according to the present embodiment may contain other components (optional components) in addition to the above-described (P) component.

Examples of such optional components include a photosensitive agent component, a thermal acid generator component, a photoacid generator component, an organic solvent component, a surfactant, and a sensitizer.

<<Photosensitive Agent Component>>

Suitable examples of the photosensitive agent component (hereinafter, also referred to as "(C) component") include an esterification reaction product of a 1,2-naphthoquinone diazide sulfonic acid compound and a phenolic hydroxyl group-containing compound represented by Chemical Formula (c1) (hereinafter, this esterification product is also referred to as "(C1) component").

[Chemical Formula 3]

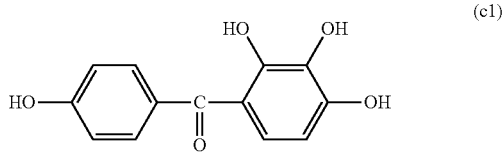

Examples of the 1,2-naphthoquinone diazide sulfonic acid compound include a 1,2-naphthoquinonediazide-5-sulfonyl compound and a 1,2-naphthoquinonediazide-4-sulfonyl compound. Among these, a 1,2-naphthoquinonediazide-5-sulfonyl compound is preferable.

Hereinafter, specific suitable examples of (C1) component will be described.

[Chemical Formula 4]

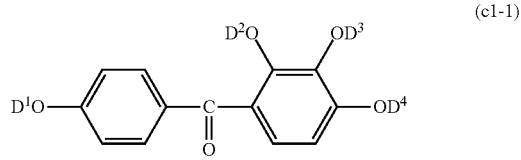

[In Formula (c1-1), $D^1$ to $D^4$ each independently represent a hydrogen atom or a 1,2-naphthoquinonediazide-5-sulfonyl group. At least one of $D^1$ to $D^4$ represents a 1,2-naphthoquinonediazide-5-sulfonyl group.]

The esterification rate of (C1) component is preferably in a range of 50% to 70% and more preferably in a range of 55% to 65%. In a case where the esterification rate thereof is 50% or greater, reduction of a film after an alkali development treatment is suppressed and the residual film rate is increased. In a case where the esterification rate is 70% or less, the storage stability is further improved.

Here, the "esterification rate" related to the component represented by Formula (c1-1) indicates the ratio of $D^1$ to $D^4$ in Formula (c1-1) being substituted with a 1,2-naphthoquinonediazide-5-sulfonyl group.

From the viewpoints of being extremely inexpensive and achieving high sensitivity, (C1) component is also preferable.

Further, as (C) component, a photosensitive agent component (hereinafter, also referred to as "(C2) component") other than (C1) component can be used.

Suitable examples of (C2) component include an esterification reaction product of the following phenolic hydroxyl group-containing compound ((c2-phe) component) and a 1,2-naphthoquinonediazidesulfonic acid compound (preferably a 1,2-naphthoquinonediazide-5-sulfonyl compound or a 1,2-naphthoquinonediazide-4-sulfonyl compound).

Examples of the (c2-phe) component include tris(4-hydroxyphenyl)methane, bis(4-hydroxy-3-methylphenyl)-2-hydroxyphenylmethane, bis(4-hydroxy-2,3,5-trimethylphenyl)-2-hydroxyphenylmethane, bis(4-hydroxy-3,5-dimethylphenyl)-4-hydroxyphenylmethane, bis(4-hydroxy-3,5-dimethylphenyl)-3-hydroxyphenylmethane, bis(4-hydroxy-3,5-dimethylphenyl)-2-hydroxyphenylmethane, bis(4-hydroxy-2,5-dimethylphenyl)-4-hydroxyphenylmethane, bis(4-hydroxy-2,5-dimethylphenyl)-3-hydroxyphenylmethane, bis(4-hydroxy-2,5-dimethylphenyl)-2-hydroxyphenylmethane, bis(4-hydroxy-3,5-dimethylphenyl)-3,4-dihydroxyphenylmethane, bis(4-hydroxy-2,5-dimethylphenyl)-3,4-dihydroxyphenylmethane, bis(4-hydroxy-2,5-dimethylphenyl)-2,4-dihydroxyphenylmethane, bis(4-hydroxyphenyl)-3-methoxy-4-hydroxyphenylmethane, bis(5-cyclohexyl-4-hydroxy-2-methylphenyl)-4-hydroxyphenylmethane, bis(5-cyclohexyl-4-hydroxy-2-methylphenyl)-3-hydroxyphenylmethane, bis(5-cyclohexyl-4-hydroxy-2-methylphenyl)-2-hydroxyphenylmethane, bis(5-cyclohexyl-4-hydroxy-2-methylphenyl)-3,4-dihydroxyphenylmethane, bis(2,3,5-trimethyl-4-hydroxyphenyl)-2-hydroxyphenylmethane, 1-[1-(4-hydroxyphenyl)isopropyl]-4-[1,1-bis(4-hydroxyphenyl)ethyl]benzene, 1-[1-(3-methyl-4-hydroxyphenyl)isopropyl]-4-[1,1-bis(3-methyl-4-hydroxyphenyl)ethyl]benzene, 2-(2,3,4-trihydroxyphenyl)-2-(2',3',4'-trihydroxyphenyl)propane, 2-(2,4-dihydroxyphenyl)-2-(2',4'-dihydroxyphenyl)propane, 2-(4-hydroxyphenyl)-2-(4'-hydroxyphenyl)propane, 2-(3-fluoro-4-hydroxyphenyl)-2-(3'-fluoro-4'-hydroxyphenyl)propane, 2-(2,4-dihydroxyphenyl)-2-(4'-hydroxyphenyl)propane, 2-(2,3,4-trihydroxyphenyl)-2-(4'-hydroxyphenyl)propane, 2-(2,3,4-trihydroxyphenyl)-2-(4'-hydroxy-3',5'-dimethylphenyl)propane, bis(2,3,4-trihydroxyphenyl)methane, bis(2,4-dihydroxyphenyl)methane, 2,3,4-trihydroxyphenyl-4'-hydroxyphenylmethane, 1,1-di(4-hydroxyphenyl)cyclohexane, and 2,4-bis[1-(4-hydroxyphenyl)isopropyl]-5-hydroxyphenol.

(C) component contained in the composition for forming a separation layer according to the present embodiment may be used alone or in combination of two or more kinds thereof.

In the composition for forming a separation layer according to the present embodiment, it is preferable that (C1) component among the components described above is used as (C) component.

In a case where the composition for forming a separation layer according to the present embodiment contains (C) component, the content of (C) component with respect to 100 parts by mass of (P) component is preferably 95 parts by mass or less, more preferably in a range of 50 to 95 parts by mass, and still more preferably in a range of 60 to 90 parts by mass.

In a case where the content of (C) component is in the above-described preferable range, the photoreactivity of the separation layer is further increased.

<<Thermal Acid Generator>>

It is preferable that the composition for forming a separation layer according to the present embodiment further contains a thermal acid generator (hereinafter, also referred to as "(T) component"). In a case where such a composition for forming a separation layer contains (T) component, since oxidation of the separation layer is promoted due to an action of an acid generated from (T) component when heated or the like at the time of baking, the separation layer is likely to be modified by irradiation with light (the photoreactivity of the separation layer is increased).

(T) component can be appropriately selected from known components and used, and the temperature for generating an acid is preferably higher than or equal to the temperature of pre-baking the support base coated with the composition for forming a separation layer, more preferably 110° C. or higher, and still more preferably 130° C. or higher.

Examples of such (T) component include trifluoromethane sulfonate, hexafluorophosphate, perfluorobutane sulfonate, a boron trifluoride salt, and a boron trifluoride ether complex compound. Preferred examples of (T) component include a compound formed of a cationic moiety and an anionic moiety shown below.

[Chemical Formula 5]

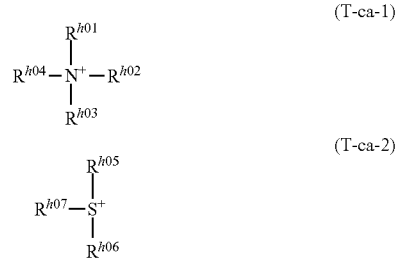

(T-ca-1)

(T-ca-2)

[In Formula (T-ca-1), $R^{h01}$ to $R^{h04}$ each independently represent a group selected from the group consisting of a hydrogen atom, an alkyl group having 1 to 20 carbon atoms, and an aryl group, and at least one of $R^{h01}$ to $R^{h04}$ represents an aryl group. The alkyl group or the aryl group may be substituted with a substituent. In Formula (T-ca-2), $R^{h05}$ to $R^{h07}$ each independently represent a group selected from the group consisting of an alkyl group having 1 to 20 carbon atoms and an aryl group, and at least one of $R^{h05}$ to $R^{h07}$ represents an aryl group. The alkyl group or the aryl group may be substituted with a substituent.]

Regarding Cationic Moiety of (T) Component

In Formula (T-ca-1), the alkyl group as $R^{h01}$ to $R^{h04}$ has 1 to 20 carbon atoms, preferably 1 to 10 carbon atoms, and more preferably 1 to 5 carbon atoms. Further, a linear or branched alkyl group having 1 to 5 carbon atoms is still more preferable. Specific examples thereof include a methyl group, an ethyl group, a propyl group, an isopropyl group, an n-butyl group, an isobutyl group, a tert-butyl group, a pentyl group, an isopentyl group, and a neopentyl group. Among these, a methyl group or an ethyl group is preferable.

The alkyl group as $R^{h01}$ to $R^{h04}$ may have a substituent. Examples of the substituent include an alkoxy group, a halogen atom, a halogenated alkyl group, a hydroxyl group, a carbonyl group, a nitro group, an amino group, and a cyclic group.

As the alkoxy group as a substituent of the alkyl group, an alkoxy group having 1 to 5 carbon atoms is preferable, a methoxy group, an ethoxy group, an n-propoxy group, an iso-propoxy group, an n-butoxy group, or a tert-butoxy group is more preferable, and a methoxy group or an ethoxy group is still more preferable.

Examples of the halogen atom as a substituent of the alkyl group include a fluorine atom, a chlorine atom, a bromine atom, and an iodine atom. Among these, a fluorine atom is preferable.

Examples of the halogenated alkyl group as a substituent of the alkyl group include a group formed by substituting some or all hydrogen atoms in an alkyl group having 1 to 5 carbon atoms such as a methyl group, an ethyl group, a propyl group, an n-butyl group, or a tert-butyl group with the halogen atoms.

Examples of the carbonyl group as a substituent of the alkyl group include a group (>C=O) that substitutes a methylene group (—$CH_2$—) constituting an alkyl group. Examples of the cyclic group as a substituent of the alkyl group include an aromatic hydrocarbon group and an alicyclic hydrocarbon group (the group may be polycyclic or monocyclic). Examples of the aromatic hydrocarbon group here are the same as those for the aryl group as $R^{h01}$ to $R^{h04}$ described below. In the alicyclic hydrocarbon group here, a group formed by removing one or more hydrogen atoms from a monocycloalkane is preferable as a monocyclic alicyclic hydrocarbon group. The number of carbon atoms of the monocycloalkane is preferably in a range of 3 to 6, and specific examples thereof include cyclopentane and cyclohexane. As the polycyclic alicyclic hydrocarbon group, a group formed by removing one or more hydrogen atoms from a polycycloalkane is preferable. The number of carbon atoms of the polycycloalkane is preferably in a range of 7 to 30. Among the example, as the polycycloalkane, a polycycloalkane having a cross-linked ring-based polycyclic skeleton such as adamantane, norbornane, isobornane, tricyclodecane, or tetracyclododecane; and a polycycloalkane having a condensed ring-based polycyclic skeleton such as a cyclic group having a steroid skeleton are more preferable.

In Formula (T-ca-1), the aryl group as $R^{h01}$ to $R^{h04}$ is a hydrocarbon group having at least one aromatic ring.

The aromatic ring is not particularly limited as long as the aromatic ring has a cyclic conjugated system having $4n+2\pi$ electrons, and the aromatic ring may be monocyclic or polycyclic. The number of carbon atoms of the aromatic ring is preferably in a range of 5 to 30, more preferably in a range of 5 to 20, still more preferably in a range of 6 to 15, and particularly preferably in a range of 6 to 12.

Specific examples of the aromatic ring include an aromatic hydrocarbon ring such as benzene, naphthalene, anthracene, or phenanthrene; and an aromatic heterocycle formed by substituting some carbon atoms constituting the aromatic hydrocarbon ring with heteroatoms. Examples of the heteroatoms in the aromatic heterocycle include an oxygen atom, a sulfur atom, and a nitrogen atom. Specific examples of the aromatic heterocycle include a pyridine ring and thiophene ring.

Specific examples of the aryl group as $R^{h01}$ to $R^{h04}$ include a group formed by removing one hydrogen atom from the aromatic hydrocarbon ring or the aromatic heterocycle; a group formed by removing one hydrogen atom from an aromatic compound (such as phenyl or fluorene) having two or more aromatic rings; and a group (for example, an arylalkyl group such as a benzyl group, a phenethyl group, a 1-naphthylmethyl group, a 2-naphthylmethyl group, a 1-naphthylethyl group, or a 2-naphthylethyl group) formed by substituting one hydrogen atom in the aromatic hydrocarbon ring or the aromatic heterocycle with an alkylene group. The number of carbon atoms of the alkylene group bonded to the aromatic hydrocarbon ring or the aromatic heterocycle is preferably in a range of 1 to 4, more preferably 1 or 2, and particularly preferably 1. Among these, a group formed by removing one hydrogen atom from the aromatic hydrocarbon ring or the aromatic heterocycle or a group formed by substituting one hydrogen atom of the aromatic hydrocarbon ring or the aromatic heterocycle with an alkylene group is more preferable, and a group formed by removing one hydrogen atom from the aromatic hydrocarbon ring or a group formed by substituting one hydrogen atom of the aromatic hydrocarbon ring with one alkylene group is still more preferable.

The aryl group as $R^{h01}$ to $R^{h04}$ may have a substituent. Examples of this substituent include an alkyl group, an alkoxy group, a halogen atom, a halogenated alkyl group, a hydroxyl group, a carbonyl group, a nitro group, an amino group, a cyclic group, and an alkylcarbonyloxy group.

As the alkyl group as a substituent of the aryl group, an alkyl group having 1 to 5 carbon atoms is preferable, and preferred examples thereof include a methyl group, an ethyl group, a propyl group, an n-butyl group, and a tert-butyl group.

The explanations for the alkoxy group, the halogen atom, the halogenated alkyl group, the carbonyl group, and the cyclic group as a substituent of the aryl group are respectively the same as the explanations for the alkoxy group, the halogen atom, the halogenated alkyl group, the carbonyl group, and the cyclic group as a substituent of the alkyl group.

In the alkylcarbonyloxy group as a substituent of the aryl group, the number of carbon atoms of the alkyl moiety is preferably in a range of 1 to 5, and examples of the alkyl moiety include a methyl group, an ethyl group, a propyl group, and an isopropyl group. Among these, a methyl group or an ethyl group is preferable and a methyl group is more preferable.

However, in Formula (T-ca-1), at least one of $R^{h01}$ to $R^{h04}$ represents an aryl group which may have a substituent.

Hereinafter, specific examples of a cation represented by Formula (T-ca-1) will be described below.

[Chemical Formula 6]

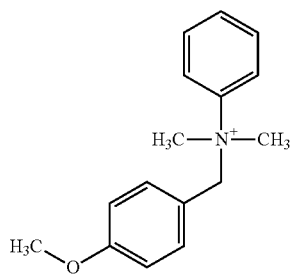

(T-ca-1-1)

In Formula (T-ca-2), the explanations for the alkyl group and the aryl group as $R^{h05}$ to $R^{h07}$ are respectively the same as the explanations for the alkyl group and the aryl group as $R^{h01}$ to $R^{h04}$.

Here, in Formula (T-ca-2), at least one of $R^{h05}$ to $R^{h07}$ represents an aryl group which may have a substituent.

Hereinafter, specific examples of a cation represented by Formula (T-ca-2) will be described.

[Chemical Formula 7]

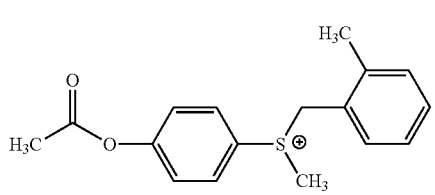

(T-ca-2-1)

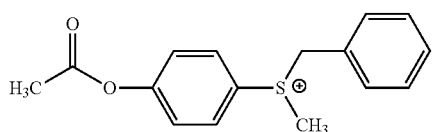

(T-ca-2-2)

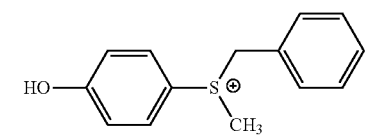

(T-ca-2-3)

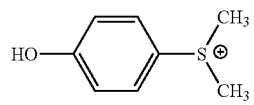

(T-ca-2-4)

Regarding Anionic Moiety of (T) Component

Examples of the anionic moiety of (T) component include a hexafluorophosphate anion, a trifluoromethanesulfonate anion, a perfluorobutanesulfonate anion, and a tetrakis(pentafluorophenyl)borate anion.

Among these, a hexafluorophosphate anion, a trifluoromethanesulfonate anion, or a perfluorobutanesulfonate anion is preferable, and a hexafluorophosphate anion or a trifluoromethanesulfonate anion is more preferable.

In the composition for forming a separation layer according to the present embodiment, examples of commercially available products of (T) component include SAN-AID SI-45, SI-47, SI-60, SI-60L, SI-80, SI-80L, SI-100, SI-100L, SI-110, SI-110L, SI-145, SI-150, SI-160, SI-180L, SI-B3, SI-B2A, SI-B3A, SI-B4, and SI-300 (all trade names, manufactured by SANSHIN CHEMICAL INDUSTRY CO., LTD.); CI-2921, CI-2920, CI-2946, CI-3128, CI-2624, CI-2639, and CI-2064 (all trade names, manufactured by Nippon Soda Co., Ltd.); CP-66 and CP-77 (manufactured by ADEKA CORPORATION); FC-520 (manufactured by 3M Company); and K-PURE TAG-2396, TAG-27135, TAG-2713, TAG-2172, TAG-2179, TAG-2168E, TAG-2722, TAG-2507, TAG-2678, TAG-2681, TAG-2679, TAG-2689, TAG-2690, TAG-2700, TAG-2710, TAG-2100, CDX-3027, CXC-1615, CXC-1616, CXC-1750, CXC-1738, CXC-1614, CXC-1742, CXC-1743, CXC-1613, CXC-1739, CXC-1751, CXC-1766, CXC-1763, CXC-1736, CXC-1756, CXC-1821, CXC-1802-60 (all trade names, manufactured by King Industries, Inc.).

(T) component contained in the composition for forming a separation layer according to the present embodiment may be one or two or more kinds thereof.

In the composition for forming a separation layer according to the present embodiment, among those described above, hexafluorophosphate, trifluoromethanesulfonate, or perfluorobutanesulfonate is preferable, trifluoromethanesulfonate is more preferable, and a quaternary ammonium salt of trifluoromethanesulfonic acid is still more preferable as (T) component.

In a case where the composition for forming a separation layer according to the present embodiment contains (T) components, the content of (T) component with respect to 100 parts by mass of (P) component is preferably in a range of 0.01 to 20 parts by mass, more preferably in a range of 1 to 15 parts by mass, and still more preferably in a range of 2 to 10 parts by mass.

In a case where the content of (T) component is in the above-described preferable range, the separation layer is likely to be modified by irradiation with light (the photoreactivity of the separation layer is increased). For example, a baked substance which is capable of suitably absorbing light having a wavelength of 600 nm or less can be easily formed by baking. In addition, the chemical resistance is further improved.

<<Photoacid Generator>>

The composition for forming a separation layer according to the present embodiment may further contain a photoacid generator. In a case where such a composition for forming a separation layer contains a photoacid generator, since oxidation of the separation layer is promoted due to an action of an acid generated from the photoacid generator when heated or the like at the time of baking, similar to the case where the composition contains (T) component described above, the separation layer is likely to be modified by irradiation with light (the photoreactivity of the separation layer is increased).

Preferred examples of the photoacid generator include an onium salt-based acid generator such as a sulfonium salt.

Preferred examples of the cationic moiety in the onium salt-based acid generator include a sulfonium cation and an iodonium cation.

Preferred examples of the anionic moiety in the onium salt-based acid generator include tetrakis(pentafluorophenyl)borate ($[B(C_6F_5)_4]^-$); tetrakis[(trifluoromethyl)phenyl]borate ($[B(C_6H_4CF_3)_4]^-$); difluorobis(pentafluorophenyl)borate ($[(C_6F_5)_2BF_2]^-$); trifluoro(pentafluorophenyl)borate ($[(C_6F_5)BF_3]^-$); and tetrakis(difluorophenyl)borate ($[B(C_6H_3F_2)_4]^-$). Further, an anion represented by Formula (b0-2a) is also preferable.

[Chemical Formula 8]

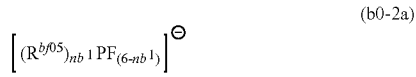

(b0-2a)

[In the formula, $R^{bf05}$ represents a fluorinated alkyl group which may have a substituent. $nb^1$ represents an integer of 1 to 5.]

In Formula (b0-2a), the number of carbon atoms of the fluorinated alkyl group as $R^{bf05}$ is preferably in a range of 1 to 10, more preferably in a range of 1 to 8, and still more preferably in a range of 1 to 5. Among these, as $R^{bf05}$, a fluorinated alkyl group having 1 to 5 carbon atoms is preferable, a perfluoroalkyl group having 1 to 5 carbon atoms is more preferable, and a trifluoromethyl group or a pentafluoroethyl group is still more preferable.

In Formula (b0-2a), $nb^1$ represents preferably an integer of 1 to 4, more preferably an integer of 2 to 4, and most preferably 3.

In a case where $nb^1$ represents 2 or greater, a plurality of $R^{bf05}$'s may be the same as or different from each other.

The photoacid generator contained in the composition for forming a separation layer according to the present embodiment may be one or two or more kinds thereof.

In a case where the composition for forming a separation layer according to the present embodiment contains a photoacid generator, the content of the photoacid generator with respect to 100 parts by mass of (P) component is preferably in a range of 0.01 to 20 parts by mass, more preferably in a range of 1 to 15 parts by mass, and still more preferably in a range of 2 to 10 parts by mass.

In a case where the content of the photoacid generator is in the above-described preferable range, the separation layer is likely to be modified by irradiation with light (the photoreactivity of the separation layer is increased). For example, a baked substance which is capable of suitably absorbing light having a wavelength of 600 nm or less can be easily formed by baking the composition for forming a separation layer. In addition, the chemical resistance is further improved.

<<Organic Solvent Component>>

For adjusting the coating workability or the like of the composition for forming a separation layer according to the present embodiment, the composition may contain an organic solvent component (hereinafter, also referred to as "(S) component").

Examples of (S) component include a linear hydrocarbon such as hexane, heptane, octane, nonane, methyloctane, decane, undecane, dodecane, or tridecane; a branched hydrocarbon having 4 to 15 carbon atoms; a cyclic hydrocarbon such as cyclohexane, cycloheptane, cyclooctane, naphthalene, decahydronaphthalene, or tetrahydronaphthalene; a terpene-based solvent such as p-menthane, o-menthane, m-menthane, diphenylmenthane, 1,4-terpin, 1,8-terpin, bornane, norbornane, pinane, thujane, carane, longifolene, geraniol, nerol, linalool, citral, citronellol, menthol, isomenthol, neomenthol, α-terpineol, β-terpineol, γ-terpineol, terpinene-1-ol, terpinene-4-ol, dihydroterpinyl acetate, 1,4-cineol, 1,8-cineol, borneol, carvone, ionone, thujone, camphor, d-limonene, l-limonene, or dipentene; lactones such as γ-butyrolactone; ketones such as acetone, methyl ethyl ketone, cyclohexanone (CH), methyl-n-pentyl ketone, methyl isopentyl ketone, and 2-heptanone; polyhydric alcohols such as ethylene glycol, diethylene glycol, propylene glycol, and dipropylene glycol; a compound having an ester bond such as ethylene glycol monoacetate, diethylene glycol monoacetate, propylene glycol monoacetate, or dipropylene glycol monoacetate; derivatives of polyhydric alcohols, for example, a compound having an ether bond such as monoalkyl ether or monophenyl ether such as monomethyl ether, monoethyl ether, monopropyl ether, or monobutyl ether of the polyhydric alcohols or the compound having an ester bond (among these, propylene glycol monomethyl ether acetate (PGMEA) or propylene glycol monomethyl ether (PGME) is preferable); cyclic ethers such as dioxane; esters such as methyl lactate, ethyl lactate (EL), methyl acetate, ethyl acetate, butyl acetate, methoxy propyl acetate, methoxy butyl acetate, methyl pyruvate, ethyl pyruvate, methyl methoxy propionate, and ethyl ethoxy propionate; and an aromatic organic solvent such as anisole, ethyl benzyl ether, cresyl methyl ether, diphenyl ether, dibenzyl ether, phenetole, or butyl phenyl ether.

(S) component contained in the composition for forming a separation layer according to the present embodiment may be one or two or more kinds thereof.

In the composition for forming a separation layer according to the present embodiment, the amount of (S) component to be used is not particularly limited as long as the concentration thereof is high enough to coat the support base or the like with the composition, and the amount thereof can be appropriately set according to the thickness of the coated film thickness or the coatability. It is preferable that (S) component is used such that the total amount of (P) component in the composition for forming a separation layer is set to preferably 70% by mass or less and more preferably in a range of 10% to 50% by mass, with respect to the total mass (100% by mass) of the composition.

<<Surfactant>>

For adjusting the coating workability or the like of the composition for forming a separation layer according to the present embodiment, the composition may contain a surfactant.

Examples of the surfactant include a silicone-based surfactant and a fluorine-based surfactant. Examples of the silicone-based surfactant include BYK-077, BYK-085, BYK-300, BYK-301, BYK-302, BYK-306, BYK-307, BYK-310, BYK-320, BYK-322, BYK-323, BYK-325, BYK-330, BYK-331, BYK-333, BYK-335, BYK-341, BYK-344, BYK-345, BYK-346, BYK-348, BYK-354, BYK-355, BYK-356, BYK-358, BYK-361, BYK-370, BYK-371, BYK-375, BYK-380, and BYK-390 (all manufactured by BYK Chemie GmbH.). Examples of the fluorine-based surfactant include F-114, F-177, F-410, F-411, F-450, F-493, F-494, F-443, F-444, F-445, F-446, F-470, F-471, F-472SF, F-474, F-475, F-477, F-478, F-479, F-480SF, F-482, F-483, F-484, F-486, F-487, F-172D, MCF-350SF, TF-1025SF, TF-1117SF, TF-1026SF, TF-1128, TF-1127, TF-1129, TF-1126, TF-1130, TF-1116SF, TF-1131, TF-1132, TF-1027SF, TF-1441, and TF-1442 (all manufactured by DIC Corporation); Polyfox Series PF-636, PF-6320, PF-656, and PF-6520 (all manufactured by Omnova Solutions, Inc.).

The surfactant contained in the composition for forming a separation layer according to the present embodiment may be one or two or more kinds thereof.

In a case where the composition for forming a separation layer according to the present embodiment contains a surfactant, the content of the surfactant with respect to 100 parts by mass of (P) component is preferably in a range of 0.01 to 10 parts by mass, more preferably in a range of 0.02 to 2 parts by mass, and still more preferably in a range of 0.03 to 1 parts by mass.

In a case where the content of the surfactant is in the above-described preferable range, a separation layer with excellent flatness can be easily formed at the time of coating the support base with the composition for forming a separation layer.

(Support Base Provided with Separation Layer)

A support base provided with a separation layer according to a second embodiment of the present invention includes a support base and a separation layer formed on the support base, the separation layer being formed of the composition for forming a separation layer according to the first embodiment.

The support base provided with a separation layer according to the present embodiment includes a separation layer formed on the support base using the composition for forming a separation layer according to the embodiment described above. Therefore, in the support base provided with a separation layer, the photoreactivity and the chemical resistance are improved.

<Support Base>

The support base has a characteristic of transmitting light. The support base is a member that supports a substrate and is bonded to the substrate with a separation layer interposed therebetween. Accordingly, it is preferable that the support base has a strength required for preventing breakage or deformation of the substrate at the time of thinning an encapsulated body, transporting the substrate, or mounting a structure on the substrate. Further, it is preferable that the support base transmits light having a wavelength capable of modifying the separation layer.

Examples of the material of the support base include glass, silicon, and an acrylic resin. Examples of the shape of the support base include a rectangle and a circle, but the present invention is not limited thereto.

Moreover, in order to further improve high density integration or production efficiency, a circular support base whose size is increased or a large-size panel having a rectangular shape in a top view can be used as the support base.

<Separation Layer>

A separation layer can be formed using the composition for forming a separation layer according to the above-described embodiment. The separation layer is a layer formed of a baked substance which is obtained by baking the resin component (P) contained in the composition for forming a separation layer. This separation layer is suitably modified by absorbing light transmitted through the support base and applied to the separation layer.

Further, the separation layer may be a layer in which a material free from a structure absorbing light is mixed within the range not impairing essential characteristics of the present invention. However, it is preferable that the separation layer is formed of only a material that absorbs light from the viewpoints of the photoreactivity and the separability.

The baked substance here is obtained by baking a composition containing (P) component. This baked substance is formed by baking a composition containing (P) component in an atmospheric environment, that is, an environment in which oxygen is present, and thus at least a part of the composition is carbonized. The baked substance constituting the separation layer in the present embodiment is capable of suitably absorbing light having a wavelength of 600 nm or less and it is preferable that the baked substance has excellent chemical resistance.

The "modification" of the separation layer indicates a phenomenon in which the separation layer is in a state where the separation layer may be destroyed by receiving an external force, or in a state where the adhesive force between the separation layer and a layer in contact with the separation layer is decreased. The separation layer becomes fragile when absorbing light, and loses the strength or the adhesive force which the separation layer possessed before being irradiated with light. The separation layer is modified by causing decomposition using the energy of absorbed light, a change in the steric configuration, dissociation of a functional group, or the like.

The thickness of the separation layer is preferably in a range of 0.05 µm to 50 µm and more preferably in a range of 0.3 µm to 1 µm.

In a case where the thickness of the separation layer is in a range of 0.05 µm to 50 µm, desired modification of the separation layer can be achieved by irradiation with light in a short time and irradiation with low-energy light.

Further, from the viewpoint of the productivity, the thickness of the separation layer is particularly preferably 1 µm or less.

For example, in the laminate 10 illustrated in FIG. 1, it is preferable that the surface of the separation layer on a side where the separation layer is in contact with the adhesive layer is flat (unevenness is not formed). In this manner, the adhesive layer can be easily formed, and the support base and the substrate are easily and uniformly bonded to each other.

The support base provided with a separation layer according to the present embodiment can be produced by performing the same operation as in the "separation layer formation step" described later.

Since the support base provided with a separation layer according to the present embodiment is provided with the separation layer to which the composition for forming a separation layer according to the embodiment described above has been applied, the photoreactivity is high and the chemical resistance is also preferably high.

(Laminate)

A laminate according to a third embodiment of the present invention includes a support base that transmits light, a substrate, and a separation layer between the support base and the substrate.

As illustrated in FIG. 1, the laminate 10 according to the present embodiment is formed by laminating the separation layer 2, the adhesive layer 3, and the substrate 4 on the support base 1 in this order.

The description of the support base 1 is the same as the description in the "Support base" above.

The description of the separation layer 2 is the same as the description in the "Separation layer" above.

<Adhesive Layer>

The adhesive layer 3 is a layer for bonding the support base 1 and the substrate 4 and, can be formed using a composition for forming an adhesive layer.

As such a composition for forming an adhesive layer, compositions containing other components such as a thermoplastic resin, a diluent, and an additive may be exemplified. The thermoplastic resin is not particularly limited as long as the adhesive force is exhibited, and it is possible to select, as the thermoplastic resin, one or two or more kinds from among a hydrocarbon resin (preferably a cycloolefin polymer or the like), an acryl-styrene-based resin, a maleimide-based resin, an elastomer resin, and a polysulfone-based resin. Examples of the diluent are the same as those described for (S) component. Examples of other components include additives for improving the performance of the adhesive layer, such as an additional resin, a curable monomer, a photopolymerization initiator, a plasticizer, an adhesive auxiliary agent, a stabilizer, a colorant, a thermal polymerization inhibitor, and a surfactant.

The thickness of the adhesive layer 3 is preferably in a range of 0.1 µm to 50 µm and more preferably in a range of 1 µm to 10 µm.

In a case where the thickness of the adhesive layer is in the range of 0.1 µm to 50 µm, the support base 1 and the substrate 4 can be more satisfactorily bonded to each other. Further, in a case where the thickness of the adhesive layer is 1 µm or greater, the substrate can be sufficiently fixed onto the support base. In a case where the thickness of the adhesive layer is 10 µm or less, the adhesive layer can be easily removed in the subsequent removal step.

<Substrate>

The substrate 4 is subjected to processes such as thinning and mounting in a state where the substrate 4 is supported by the support base 1. For example, a structure such as an integrated circuit or a metal bump is mounted on the substrate 4.

A silicon wafer substrate is typically used as the substrate 4, but the present invention is not limited thereto. For example, a ceramic substrate, a thin film substrate, or a flexible substrate may be used as the substrate.

In the present embodiment, the element is a semiconductor element or another element and may have a structure of a single layer or a plurality of layers. Further, in a case where the element is a semiconductor element, an electronic component obtained by dicing an encapsulated substrate becomes a semiconductor device.

Since the laminate according to the embodiment described above is provided with the separation layer to which the composition for forming a separation layer according to the embodiment described above has been applied, the photoreactivity is increased (suitably modified by irradiation with light), and the separability of the support base from the laminate is excellent.

In addition, since the laminate according to the embodiment is provided with the separation layer to which the composition for forming a separation layer according to the embodiment described above has been applied, the chemical resistance is increased. In this manner, the laminate according to the embodiment is unlikely to be damaged by the influence of chemicals used in an etching treatment or a lithography treatment.

In the laminate according to the embodiment described above, the support base 1 and the separation layer 2 are adjacent to each other, but the present invention is not limited thereto and another layer may be formed between the support base 1 and the separation layer 2.

In this case, another layer may be formed of a material that transmits light. In this manner, a layer imparting preferable properties to the laminate 10 can be appropriately added without disturbing incidence of light onto the separation layer 2. Depending on the type of material constituting the separation layer 2, the wavelength of light which can be used varies. Therefore, the material constituting another layer does not need to transmit light of all wavelengths, and a material can be appropriately selected from materials transmitting light having a wavelength that is capable of modifying the material constituting the separation layer 2.

Further, the laminate according to the embodiment described above includes the adhesive layer 3 for bonding the support base 1 and the substrate 4 to each other, but the present invention is not limited thereto, and the laminate may include only the separation layer 2 between the support base 1 and the substrate 4. In this case, for example, a separation layer having the function of the adhesive layer is used.

(Method of Producing Laminate)

According to a fourth aspect of the present invention, there is provided a method of producing a laminate which includes a separation layer between a support base transmitting light and a substrate. The method includes a separation layer formation step and a lamination step.

First Embodiment

Figure 2A:
FIGS. 2A and 2B are schematic step views for describing an embodiment of a method of producing a laminate.
Figure 2B:
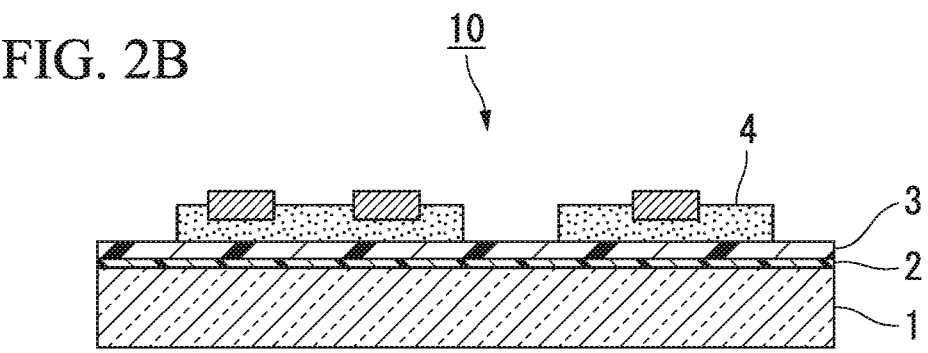

FIGS. 2A and 2B are schematic step views for describing an embodiment of a method of producing a laminate. FIG. 2A is a view for describing a separation layer formation step, and FIG. 2B is a view for describing a lamination step.

In the method of producing a laminate according to the present embodiment, a composition for forming a separation layer obtained by dissolving a resin component ((P) component) having a phenol skeleton in an organic solvent component ((S) component) is used.

Further, a composition for forming an adhesive layer obtained by dissolving a hydrocarbon resin in (S) component is used.

[Separation Layer Formation Step]

The separation layer formation step according to the embodiment is a step of coating one surface of the support base with the composition for forming a separation layer according to the embodiment described above and baking the composition to form a separation layer.

In FIG. 2A, the separation layer 2 is formed on the support base 1 (in other words, a support base provided with a separation layer is prepared) by coating the support base 1 with the composition for forming a separation layer according to the embodiment described above and baking the composition.

The method of coating the support base 1 with the composition for forming a separation layer is not particularly limited, and examples of the method include spin coating, dipping, roller blade coating, spray coating, and slit coating.

In the separation layer formation step, (S) component is removed from the coated layer of the composition for forming a separation layer which has been applied to the support base 1 in a heating environment or a reduced pressure environment, so as to form a film. (S) component can be removed by performing, for example, a bake treatment under a temperature condition of 80° to 150° C. for 120 to 360 seconds.

Thereafter, the separation layer 2 formed of a baked substance is formed by baking the film formed by removing (S) component from the coated layer described above in an atmospheric environment.

The temperature of baking the film formed by removing (S) component from the coated layer is appropriately set according to the kind of (P) component. For example, the temperature is preferably 200° C. or higher and more preferably 250° C. or higher. In a case where the temperature of baking the film is equal to or higher than the lower limit of the above-described preferable range, the separation layer which is capable of absorbing light having a wavelength of 600 nm or less can be more stably formed.

The upper limit of the temperature of baking the film is not particularly limited, but is preferably 800° C. or lower and more preferably 600° C. or lower.

The baking time is preferably in a range of 3 minutes to 3 hours and more preferably in a range of 3 minutes to 30 minutes. In this manner, the separation layer which is capable of absorbing light having a wavelength of 600 nm or less can be reliably formed.

[Lamination Step]

The lamination step according to the embodiment is a step of laminating the support base (on which the separation layer has been formed) and the substrate (on which the separation layer is not formed), wherein the separation layer and the adhesive layer are interposed between the support base and the substrate.

In FIG. 2B, the support base 1 on which the separation layer 2 has been formed and the substrate 4 on which the separation layer 2 is not formed are laminated with the separation layer 2 and the adhesive layer 3 interposed therebetween, so that the laminate 10 on which the support base 1, the separation layer 2, the adhesive layer 3, and the substrate 4 are stacked in this order is obtained.

As a specific method for the lamination step, a method of coating the separation layer 2 with the composition for forming an adhesive layer, heating the composition to form the adhesive layer 3, and bonding the support base 1 with the substrate 4 may be exemplified.

A method of coating the separation layer 2 with the composition for forming an adhesive layer is not particularly limited, but the coating may be performed according to the same method as the method of coating the support base 1 with the composition for forming a separation layer.

The bake treatment at the time of forming the adhesive layer 3 is performed by, for example, stepwise heating on the composition while increasing the temperature and removing (S) component from the composition for forming an adhesive layer to form the adhesive layer 3.

A method of bonding the support base 1 and the substrate 4 to each other is performed by disposing the substrate 4 at a predetermined position of the adhesive layer 3 and pressure-bonding the support base 1 and the substrate 4 using a die bonder or the like while heating (for example, at approximately 100° C.) the resultant in a vacuum.

According to the method of producing a laminate according to the first embodiment, since the separation layer to which the composition for forming a separation layer according to the embodiment is provided, the photoreactivity is increased and the separability of the support base from the laminate is excellent. In addition, preferably, a laminate having excellent chemical resistance can be produced.

In the method of producing a laminate according to the present embodiment, the separation layer 2 is formed on the support base 1, but the configuration is not limited thereto, and the separation layer 2 may be formed on the substrate 4.

In the method of producing a laminate according to the present embodiment, the adhesive layer 3 is formed on the separation layer 2, but the configuration is not limited thereto, and the adhesive layer 3 may be formed on the substrate 4.

Further, the separation layer 2 may be formed on both of the support base 1 and the substrate 4. In this case, the support base 1 and the substrate 4 are bonded to each other with the separation layer 2 or the adhesive layer 3 and the separation layer 2 interposed therebetween.

Second Embodiment

Figure 3A:
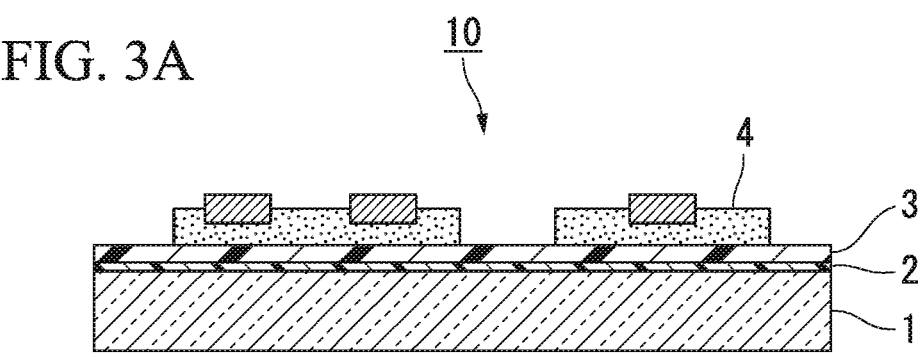
FIGS. 3A and 3B are schematic step views for describing another embodiment of a method of producing a laminate.
Figure 3B:
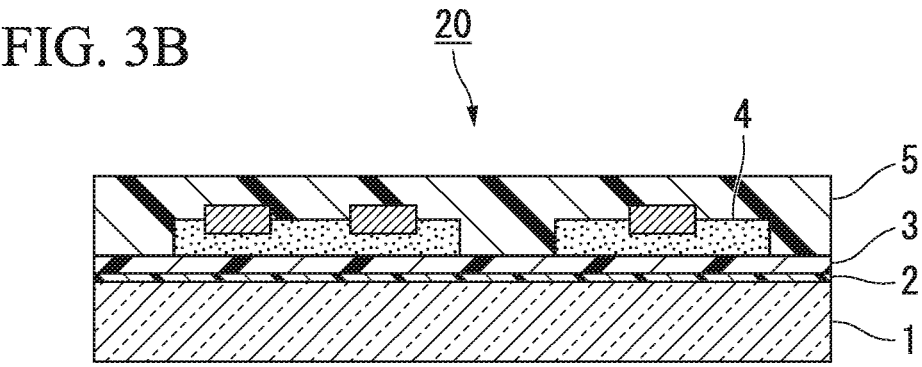

FIGS. 3A and 3B are schematic step views for describing another embodiment of a method of producing a laminate. FIG. 3A is a view illustrating the laminate produced by the production method according to the first embodiment, and FIG. 3B is a view for describing an encapsulation step.

The method of producing a laminate according to another embodiment includes an encapsulation step in addition to the separation layer formation step and the lamination step described above.

[Encapsulation Step]

The encapsulation step according to the embodiment is a step of encapsulating the substrate bonded to the support base with the adhesive layer interposed therebetween after the lamination step using an encapsulating material to prepare an encapsulated body.

In FIG. 3B, an encapsulated body 20 (laminate) obtained by encapsulating the entire substrate 4 disposed on the adhesive layer 3 with an encapsulating material is obtained.

In the encapsulation step, the encapsulated body 20 (laminate) provided with an encapsulating material layer 5 on the adhesive layer 3 is prepared by maintaining a highly viscous state of the encapsulating material heated to 130° C. to 170° C., supplying the encapsulating material onto the adhesive layer 3 so as to cover the substrate 4, and compression-forming the encapsulating material.

As the encapsulating material, for example, a composition containing an epoxy-based resin or a silicone-based resin can be used. The encapsulating material layer 5 is not provided for each individual substrate 4, and it is preferable that the encapsulating material layer is provided so as to cover the entire substrate 4 on the adhesive layer 3.

According to the method of producing a laminate according to the second embodiment, an encapsulated substrate including a substrate (wiring layer) on a separation layer and an adhesive layer can be suitably formed by applying the composition for forming a separation layer according to the embodiment described above.

Third Embodiment

Figure 4A:
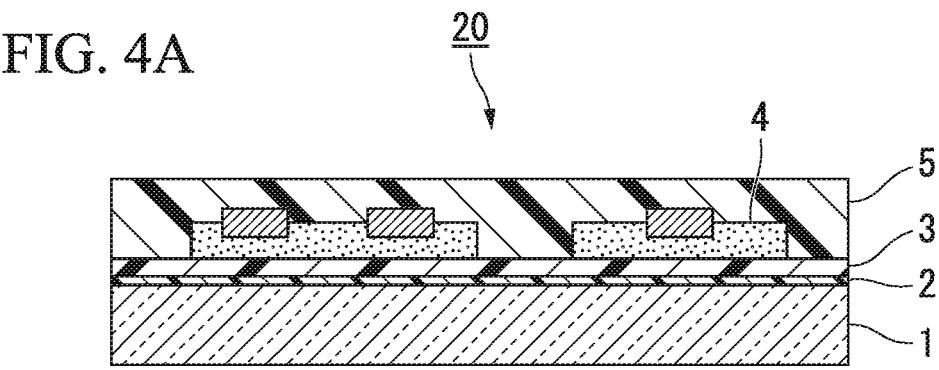
FIGS. 4A to 4C are schematic step views for describing another embodiment of a method of producing a laminate.
Figure 4B:
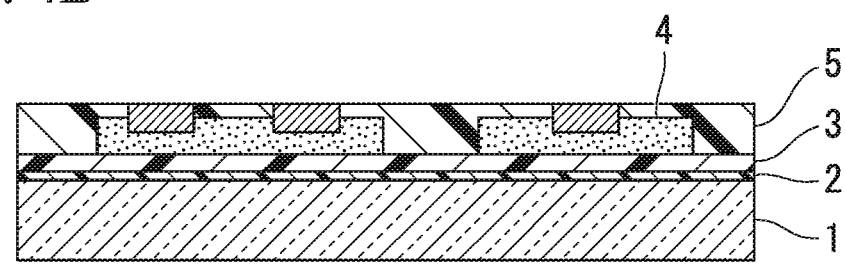
Figure 4C:
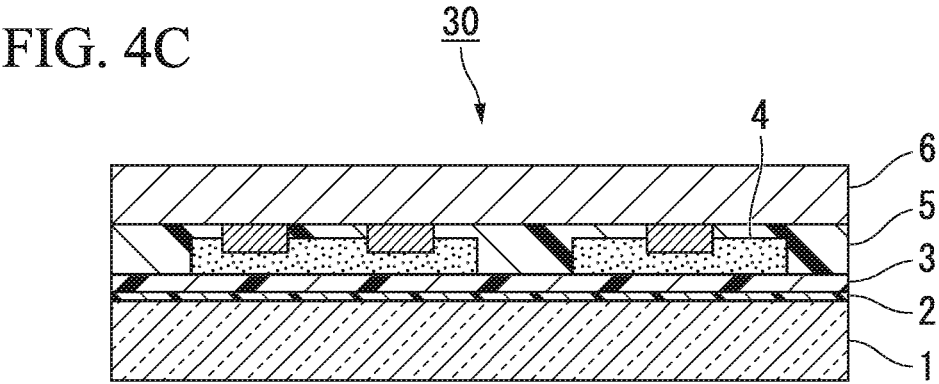

FIGS. 4A to 4C are schematic step views for describing another embodiment of a method of producing a laminate. FIG. 4A is a view illustrating an encapsulated body produced by the production method according to a second embodiment, FIG. 4B is a view for describing a grind step, and FIG. 4C is a view for describing a rewiring formation step.

The method of producing a laminate according to still another embodiment includes a grind step and a rewiring formation step in addition to the separation layer formation step, the lamination step, and the encapsulation step described above.

[Grind Step]

The grind step according to the embodiment is a step of grinding the encapsulating material portion (encapsulating material layer 5) in the encapsulated body 20 such that a part of the substrate 4 is exposed after the encapsulation step.

The encapsulating material portion is ground by scraping the encapsulating material layer 5 until the thickness thereof becomes substantially the same as the thickness of the substrate 4 as illustrated in FIG. 4B.

[Rewiring Formation Step]

The rewiring formation step according to the embodiment is a step of forming a rewiring layer 6 on the exposed substrate 4 after the grind step.

The rewiring layer is referred to as a redistribution layer (RDL). The rewiring layer is a wired substance having a thin film constituting a wiring connected to an element. The rewiring layer may have a structure having a single layer or a plurality of layers. For example, the rewiring layer is a layer in which a wiring is formed on a dielectric (for example, silicon oxide ($SiO_x$) or a photosensitive resin such as photosensitive epoxy) by a conductor (a metal such as aluminum, copper, titanium, nickel, gold, or silver; or an alloy such as a silver-tin alloy), but the configuration is not limited thereto.

According to the method of forming the rewiring layer 6, first, a dielectric layer such as silicon oxide ($SiO_x$) or a photosensitive resin is formed on the encapsulating material layer 5. A dielectric layer formed of silicon oxide can be formed by a sputtering method or a vacuum deposition method. A dielectric layer formed of a photosensitive resin can be formed by coating the encapsulating material layer 5 with a photosensitive resin by spin coating, dipping, roller blade coating, spray coating, or slit coating.

Next, a wiring is formed on the dielectric layer using a conductor such as a metal.

As a method of forming a wiring, for example, a lithography treatment such as photolithography (resist lithography) or a known semiconductor process method such as an etching treatment can be used. Examples of such a lithography treatment include a lithography treatment using a positive type resist material and a lithography treatment using a negative type resist material.

While the photolithography treatment and the etching treatment are performed, the separation layer 2 is exposed to an acid such as hydrofluoric acid, an alkali such as tetramethylammonium hydroxide (TMAH), or a resist solvent for dissolving a resist material. Particularly, in the fan-out technology, PGMEA, cyclopentanone, cycloheptanone, N-methyl-2-pyrrolidone (NMP), or cyclohexanone is used as the resist solvent.

However, by forming a separation layer using the composition for forming a separation layer according to the present embodiment, the separation layer has high chemical resistance. Therefore, in a case where the separation layer is exposed to not only an acid or an alkali but also a resist solvent, the separation layer is unlikely to be dissolved or delaminated.

As described above, the rewiring layer 6 can be suitably formed on the sealing material layer 5.

According to the method of producing a laminate according to the third embodiment, a laminate 30 formed by laminating the support base 1, the separation layer 2, the adhesive layer 3, the encapsulating material layer 5 that covers the substrate 4, and the rewiring layer 6 in this order can be stably produced.

Such a laminate 30 is a laminate prepared in the process based on the fan-out technique, in which a terminal provided on the substrate 4 is mounted on the rewiring layer 6 spreading outside a chip area.

According to the method of producing a laminate according to the present embodiment, a bump can be formed on the rewiring layer 6 or an element can be mounted on the rewiring layer 6. An element can be mounted on the rewiring layer 6 using a chip mounter or the like.

(Method of Producing Electronic Component)

A method of producing an electronic component according to a fifth embodiment of the present invention includes a separation step and a removal step after the laminate has been obtained by the method of producing a laminate according to the fourth embodiment.

Figure 5A:
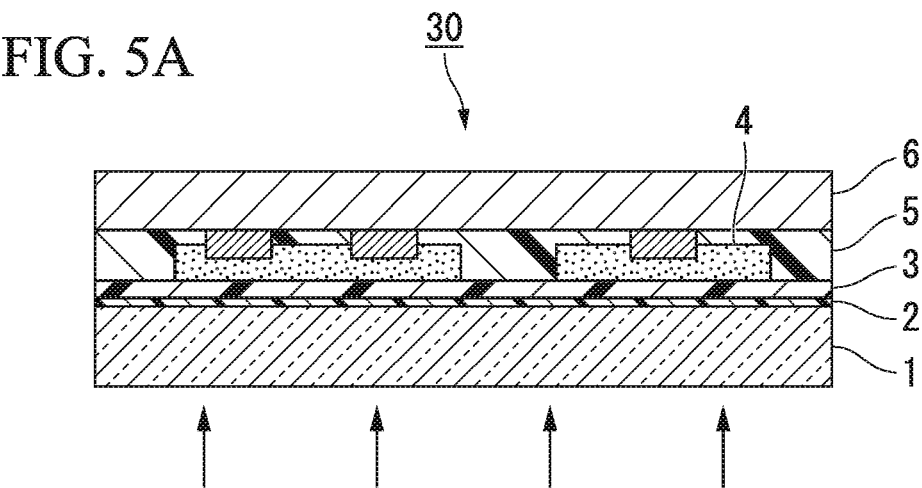
FIGS. 5A to 5C are schematic step views for describing an embodiment of a method of producing a semiconductor package (electronic component).
Figure 5B:
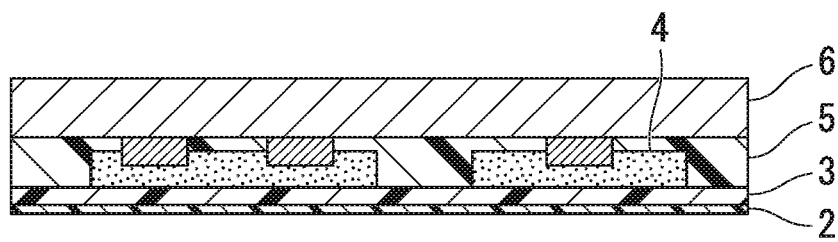
Figure 5C:
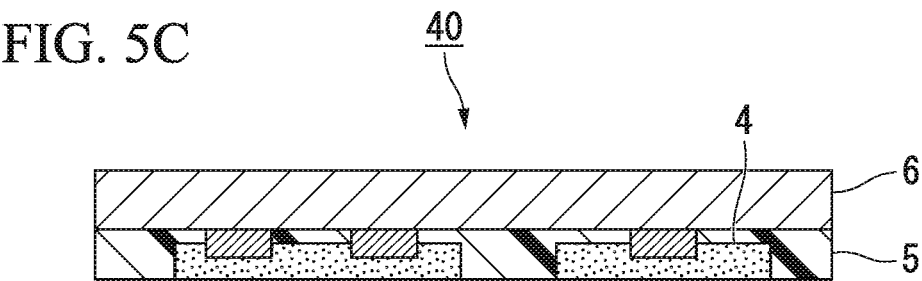

FIGS. 5A to 5C are schematic step views for describing an embodiment of a method of producing a semiconductor package (electronic component). FIG. 5A is a view illustrating the laminate produced by the production method according to the third embodiment. FIG. 5B is a view for describing a separation step, and FIG. 5C is a view for describing a removal step.

[Separation Step]

The separation step according to the embodiment is a step of separating the support base 1 from the laminate 30 by irradiating the separation layer 2 with light (arrows) through the support base 1 to modify the separation layer 2.

As illustrated in FIG. 5A, the separation layer 2 is modified by irradiating the separation layer 2 with light (arrows) through the support base 1 in the separation step.

As the wavelength which is capable of modifying the separation layer 2, a wavelength of 600 nm or less is exemplified.

The type and the wavelength of light to be applied may be appropriately selected according to the transmitting properties of the support base 1 and the material of the separation layer 2, and examples thereof include, for example, laser light such as a solid laser such as a YAG laser, a ruby laser, a glass laser, a $YVO_4$ laser, an LD laser, or a fiber laser, a liquid laser such as a dye laser, a gas laser such as a $CO_2$ laser, an excimer laser, an Ar laser, or a He—Ne layer, a semiconductor laser, or a free electron laser; and non-laser light. As described above, the support base 1 and the substrate 4 can be easily separated from each other by modifying the separation layer 2.

In a case where the separation layer is irradiated with laser light, examples of the condition for irradiation with laser light include the following conditions.

The average output value of the laser light is preferably in a range of 1.0 W to 5.0 W and more preferably in a range of 3.0 W to 4.0 W. The repetition frequency of the laser light is preferably in a range of 20 kHz to 60 kHz and more preferably in a range of 30 kHz to 50 kHz. The scanning speed of the laser light is preferably in a range of 100 mm/s to 10000 mm/s.

After the separation layer 2 is irradiated with light (arrows) so that the separation layer 2 is modified, the support base 1 is separated from the laminate 30 as illustrated in FIG. 5B.

For example, the support base 1 and the substrate 4 are separated from each other by applying a force to a direction in which the support base 1 and the substrate 4 could be separated from each other. Specifically, the support base 1 and the substrate 4 can be separated from each other by fixing one of the support base 1 and the substrate 4 (rewiring layer 6), adsorbing and holding the other one of the support base 1 and the substrate 4 (rewiring layer 6) using a separation plate including a suction pad such as a bellow pad to lift the other one of the support base 1 and the substrate 4 (rewiring layer 6).

The force applied to the laminate 30 may be appropriately adjusted according to the size or the like of the laminate 30 without limitation. For example, in a case of a laminate having a diameter of approximately 300 mm, the support base 1 and the substrate 4 can be suitably separated from each other by applying a force of 0.1 to 5 kgf (0.98 to 49 N) thereto.

[Removal Step]

The removal step according to the embodiment is a step of removing the adhesive layer 3 adhered to the substrate 4 after the separation step.

In FIG. 5B, the adhesive layer 3 and the separation layer 2 are adhered to the substrate 4 after the separation step. According to the present embodiment, an electronic component 40 illustrated in FIG. 5C is obtained by removing the adhesive layer 3 and the separation layer 2 adhered to the substrate 4 in the removal step.

Examples of the method of removing the adhesive layer 3 or the like adhering to the substrate 4 include a method of removing residues of the adhesive layer 3 and the separation layer 2 using a washing solution and a method of applying plasma.

A washing solution containing an organic solvent is suitably used as the washing solution. As the organic solvent, an organic solvent mixed into the composition for forming a separation layer or an organic solvent mixed into the composition for forming an adhesive layer is preferably used.

Other Embodiments

Figure 6A:
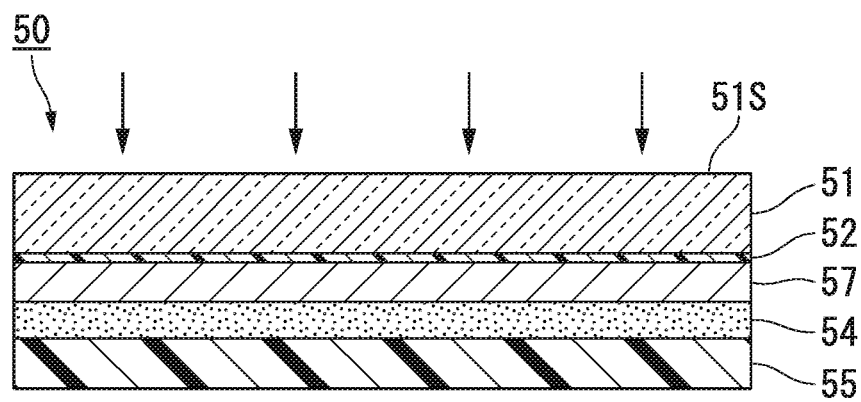
FIGS. 6A to 6C are schematic step views for describing other embodiments of the method of producing a semiconductor package (electronic component).
Figure 6B:
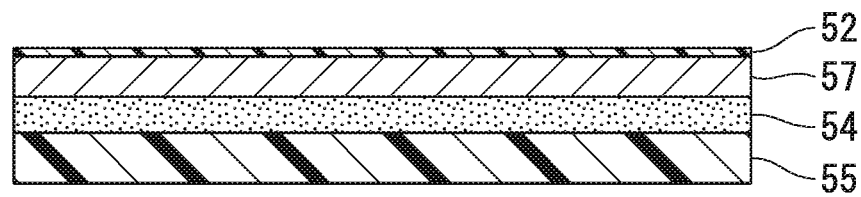
Figure 6C:
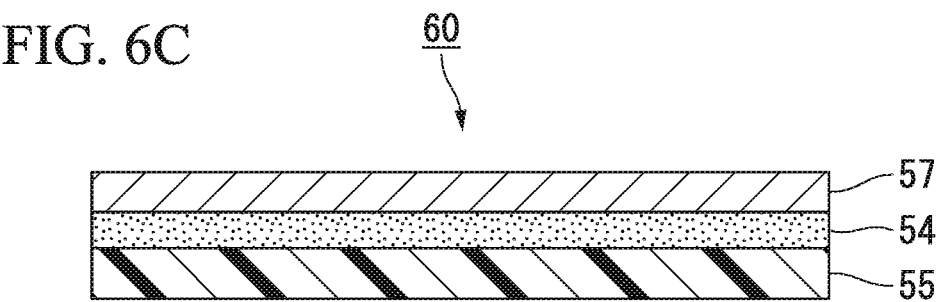

FIGS. 6A to 6C are schematic step views for describing other embodiments of the method of producing a semiconductor package (electronic component). FIG. 6A is a schematic view illustrating another embodiment of a laminate to which the present invention has been applied, FIG. 6B is a view for describing a separation step, and FIG. 6C is a view for describing a removal step.

A laminate 50 according to the embodiment illustrated in FIG. 6A is formed by laminating a support base 51, a separation layer 52, a wiring layer 57, a substrate 54, and an encapsulating material layer 55 in this order from an outermost surface 51s side.

The description of the support base 51 is the same as the description in the "Support base" above.

The description of the separation layer 52 is the same as the description in the "Separation layer" above.

As the wiring layer 57, a layer in which a wiring is formed on a dielectric (for example, silicon oxide ($SiO_x$) or a photosensitive resin such as photosensitive epoxy) by a conductor (a metal such as aluminum, copper, titanium, nickel, gold, or silver; or an alloy such as a silver-tin alloy) is exemplified.

The description of the substrate 54 is the same as the description in the "Substrate" above.

As the encapsulating material layer 55, a layer formed by using a composition containing an epoxy-based resin or a silicone-based resin is exemplified.

The laminate 50 can be produced as follows.

First, the separation layer 52 is formed on a surface of the support base 51 on a side opposite to a side where the outermost surface 51s is provided. The separation layer 52 may be formed in the same manner as in the "separation layer formation step" described above.

Next, the wiring layer 57 is formed on a surface of the separation layer 52 on a side opposite to a side where the support base 51 is provided. The wiring layer 57 may be formed in the same manner as in the "rewiring formation step" described above.

Next, the substrate 54 is bonded to a surface of the wiring layer 57 on a side opposite to a side where the separation layer 52 is provided, through a bump or the like.

Next, the substrate 54 is encapsulated using an encapsulating material such that the substrate 54 bonded to the wiring layer 57 is covered to form the encapsulating material layer 55. The encapsulating material layer 55 may be formed in the same manner as in the "encapsulation step" described above. In this manner, the laminate 50 is produced.

As illustrated in FIG. 6A, the separation layer 52 is irradiated with light (arrows) through the support base 51 to modify the separation layer 52 in the separation step according to the embodiment.

After the separation layer 52 is irradiated with light (arrows) and the separation layer 52 is modified, the support base 51 is separated from the laminate 50 as illustrated in FIG. 6B. The operation in such a separation step may be performed in the same manner as the operation in the "separation step" described above.

As illustrated in FIG. 6C, in the removal step according to the embodiment, an electronic component 60 is obtained by removing the separation layer 52 adhered to the wiring layer 57 after the separation step.

Examples of the method of removing the separation layer 52 adhered to the wiring layer 57 include a method of applying plasma and a method of removing residues of the separation layer 52 using a washing solution. As the plasma, oxygen plasma is suitably used.

According to the method of producing an electronic component of the present embodiment, a solder ball formation treatment, a dicing treatment, or an oxide film formation treatment may be further performed on the electronic component after the removal step.

EXAMPLES

Hereinafter, the present invention will be described in more detail with reference to the following examples, but the present invention is not limited to these examples.

<Resin Component (P)>

In the present example, resins (P-1) to (P-4) described below were used.

Resin (P-1): aminophenol-containing resin, GSP01 (trade name), manufactured by Gun Ei Chemical Industry Co., Ltd., weight-average molecular weight of 12000

Resin (P-2): aminophenol-containing resin, GSP02 (trade name), manufactured by Gun Ei Chemical Industry Co., Ltd., weight-average molecular weight of 2300

Resin (P-3): aminophenol-containing resin, GSP03 (trade name), manufactured by Gun Ei Chemical Industry Co., Ltd., weight-average molecular weight of 6000

Resin (P-4): naphthol novolak resin having a weight-average molecular weight of 3280.

<Preparation (1) of Composition for Forming Separation Layer>

Examples 1 to 5

Compositions (resin component concentration of 30% by mass) for forming a separation layer of each example were respectively prepared by mixing and dissolving each component listed in Table 1.

TABLE 1

|  | Resin component (P) | Thermal acid generator (T) | Organic solvent component (S) |
|---|---|---|---|
| Example 1 | (P)-1 [100] | (T)-1 [5] | (S)-1 [225] |
| Example 2 | (P)-2 [100] | (T)-1 [5] | (S)-1 [225] |
| Example 3 | (P)-1 [100] | — | (S)-1 [230] |
| Example 4 | (P)-2 [100] | — | (S)-1 [230] |
| Example 5 | (P)-3 [100] | — | (S)-1 [230] |

In Table 1, each abbreviation has the following meaning. The numerical values in the parentheses represents the blending amount (parts by mass).

(P)-1: resin (P-1) described above (P)-2: resin (P-2) described above (P)-3: resin (P-3) described above (T)-1: quaternary ammonium salt block species, TAG 2689 (trade name), manufactured by King Industries, Inc.

(S)-1: mixed solvent containing propylene glycol monomethyl ether acetate and propylene glycol monomethyl ether at a mixing ratio of 1:1 (mass ratio)

<Formation of Separation Layer>

A bare glass support base (12 inches, thickness of 0.7 mm) was spin-coated with each composition for forming a separation layer of each example, heated under a temperature condition of 100° C. for 300 seconds, further heated under a temperature condition of 150° C. for 300 seconds to remove the solvent, thereby forming a film having a film thickness of 1.8 μm.

Next, the formed film was baked under a temperature condition of 300° C. for 20 minutes in an atmospheric environment to form a separation layer on the bare glass support base, thereby obtaining a support base provided with a separation layer. The thickness of the separation layer formed during this process is listed in Table 2.

[Evaluation of Transmittance of Light in Separation Layer]

In the "Formation of separation layer" described above, the transmittance of light having a wavelength of 532 nm in each film formed on the bare glass support base was evaluated by irradiating each film in a state before being baked and the film in a state after being baked (separation layer), formed using the composition for forming a separation layer of each example, with light having a wavelength of 380 to 780 nm using a spectroscopic analysis device UV-3600 (manufactured by Shimadzu Corporation). The evaluation results are listed in Table 2.

[Evaluation of Laser Reactivity in Separation Layer]

The laser reactivity was evaluated by irradiating each separation layer formed using the composition for forming a separation layer of each example with laser light having a wavelength of 532 nm under conditions of a scanning speed of 3000 mm/sec, a frequency of 40 kHz, an output (current value) of 24 A, and an irradiation pitch of 140 μm.

The evaluation of such layer reactivity was performed by observing the state of a trace of laser light applied to the separation layer using a microscope VHX-600 (manufactured by KEYENCE CORPORATION).

The criteria of the evaluation of the laser reactivity were set as follows using the size of the trace (diameter of scratch) of the laser light on the surface of the separation layer as an index. The evaluation results are listed in Table 2.

Criteria of Evaluation of Laser Reactivity

A: The diameter of scratch was 100 μm or greater.

B: The diameter of scratch was 50 μm or greater and less than 100 μm.

C: The diameter of scratch was less than 50 μm.

D: There was no trace of laser light.

TABLE 2

|  |  | Light transmittance | | |
|---|---|---|---|---|
|  | Thickness of separation layer (μm) | Initial transmittance before baking (%) | Transmittance after baking (%) | Laser reactivity |
| Example 1 | 1.84 | >95 | 7.5 | B |
| Example 2 | 0.80 | >95 | 11.5 | A |
| Example 3 | 1.59 | >95 | 20.6 | C |
| Example 4 | 1.04 | >95 | 19.3 | A |
| Example 5 | 1.27 | >95 | 29.9 | C |

As shown in the results listed in Table 2, it was confirmed that all separation layers formed using the compositions for forming a separation layer of Examples 1 to 5 exhibited absorbability with respect to light having a wavelength of 532 nm and had photoreactivity.

[Evaluation of Chemical Resistance of Separation Layer]

A separation layer was formed on a bare glass support base using the composition for forming a separation layer of Example 2 in the same manner as in the "Formation of separation layer" described above.

Further, as Comparative Example 1, a separation layer formed of fluorocarbon was formed on a glass support base.

This separation layer formed of fluorocarbon was formed on the glass support base under conditions of a flow rate of 400 sccm, a pressure of 700 mTorr, a high-frequency power of 2500 W, and a film forming temperature of 240° C. using reaction gas $C_4F_8$ according to a CVD method (layer thickness of 1.0 μm).

Next, the chemical resistance was evaluated by immersing each separation layer formed on the bare glass support base respectively in propylene glycol monomethyl ether acetate (PGMEA), N-methyl-2-pyrrolidone (NMP), and cycloheptanone under conditions of a temperature of 25° C. for 10 minutes.

Further, the chemical resistance was evaluated by immersing each separation layer formed on the bare glass support base in a resist peeling solution ST120 (manufactured by TOKYO OHKA KOGYO CO., LTD.) under conditions of a temperature of 60° C. for 30 minutes.

The chemical resistance was evaluated by performing visual observation. A case where a separation layer formed on the glass support base was not swollen or delaminated was evaluated as "A" and a case where at least one of the swelling and the delamination was found from a separation layer was evaluated as "C". The evaluation results are listed in Table 3.

The transmittance of light having a wavelength of 532 nm in each film was evaluated with respect to the separation layer formed using the composition for forming a separation layer of Example 2 and the separation layer formed of fluorocarbon of Comparative Example 1 in the same manner as in the "Evaluation of transmittance of light in separation layer". The evaluation results are listed in Table 3.

TABLE 3

|  |  | Example 2 | Comparative Example 1 |
|---|---|---|---|
| Thickness of separation layer (μm) | | 1.8 | 0.5 |
| Light transmittance (%) | | 7.5 | 30 |
| Chemical resistance | Temperature of 25° C. for 10 minutes | PGMEA | A | A |
| | | NMP | A | C |
| | | Cycloheptanone | A | C |
| | Temperature of 60° C. for 30 minutes | Resist peeling solution ST120 | A | C |

As shown in the results listed in Table 3, it was confirmed that the separation layer formed using the composition for forming a separation layer of Example 2 had higher chemical resistance than that of the separation layer formed of fluorocarbon of Comparative Example 1.

<Preparation (2) of Composition for Forming Separation Layer>

Examples 6 to 15

Compositions (resin component concentration of 30% by mass) for forming a separation layer of each example were respectively prepared by mixing and dissolving each component listed in Table 4.

TABLE 4

|  | Resin component (P) | | | Thermal acid generator (T) | Organic solvent component (S) |
|---|---|---|---|---|---|
| Example 6 | — | — | (P)-4 [100] | (T)-1 [5] | (S)-1 [225] |
| Example 7 | (P)-1 [7] | (P)-2 [3] | (P)-4 [90] | (T)-1 [5] | (S)-1 [225] |
| Example 8 | (P)-1 [14] | (P)-2 [6] | (P)-4 [80] | (T)-1 [5] | (S)-1 [225] |
| Example 9 | (P)-1 [21] | (P)-2 [9] | (P)-4 [70] | (T)-1 [5] | (S)-1 [225] |
| Example 10 | (P)-1 [35] | (P)-2 [15] | (P)-4 [50] | (T)-1 [5] | (S)-1 [225] |
| Example 11 | (P)-1 [49] | (P)-2 [21] | (P)-4 [30] | (T)-1 [5] | (S)-1 [225] |
| Example 12 | (P)-1 [56] | (P)-2 [24] | (P)-4 [20] | (T)-1 [5] | (S)-1 [225] |
| Example 13 | (P)-1 [63] | (P)-2 [27] | (P)-4 [10] | (T)-1 [5] | (S)-1 [225] |
| Example 14 | (P)-1 [66.5] | (P)-2 [28.5] | (P)-4 [5] | (T)-1 [5] | (S)-1 [225] |
| Example 15 | (P)-1 [70] | (P)-2 [30] | — | (T)-1 [5] | (S)-1 [225] |

In Table 4, each abbreviation has the following meaning. The numerical values in the parentheses represents the blending amount (parts by mass).

(P)-1: resin (P-1) described above
(P)-2: resin (P-2) described above
(P)-4: resin (P-4) described above
(T)-1: quaternary ammonium salt block species, TAG 2689 (trade name), manufactured by King Industries, Inc.
(S)-1: mixed solvent containing propylene glycol monomethyl ether acetate and propylene glycol monomethyl ether at a mixing ratio of 1:1 (mass ratio)

<Formation of Separation Layer>

A bare glass support base (12 inches, thickness of 0.7 mm) was spin-coated with each composition for forming a separation layer of each example, heated under a temperature condition of 100° C. for 300 seconds, further heated under a temperature condition of 150° C. for 300 seconds to remove the solvent, thereby forming a film having a film thickness of 1.8 μm.

Next, the formed film was baked under a temperature condition of 260° C., 280° C., or 300° C. for 20 minutes in an atmospheric environment to form a separation layer on the bare glass support base, thereby obtaining a support base provided with a separation layer. The thickness of the separation layer formed during this process is listed in Tables 5 and 6.

[Evaluation of Transmittance of Light in Separation Layer]

In the "Formation of separation layer" described above, the transmittance of light having a wavelength of 532 nm in each film formed on the bare glass support base was evaluated by irradiating each film in a state after being baked (separation layer), formed using the composition for forming a separation layer of each example, with light having a wavelength of 380 to 780 nm using a spectroscopic analysis device UV-3600 (manufactured by Shimadzu Corporation). The evaluation results are listed in Tables 5 and 6.

[Evaluation of Laser Reactivity in Separation Layer]

The laser reactivity was evaluated by irradiating each separation layer formed using the composition for forming a separation layer of each example with laser light having a wavelength of 532 nm under conditions of a scanning speed of 3000 mm/sec, a frequency of 40 kHz, an output (current value) of 24 A, and an irradiation pitch of 140 μm.

The evaluation of such laser reactivity was performed by observing the state of a trace of laser light applied to the separation layer using a microscope VHX-600 (manufactured by KEYENCE CORPORATION).

The criteria of the evaluation of the laser reactivity were set as follows using the size of the trace (diameter of scratch) of the laser light on the surface of the separation layer as an index. The evaluation results are listed in Tables 5 and 6.

Criteria of Evaluation of Laser Reactivity

A: The diameter of scratch was 100 μm or greater.
B: The diameter of scratch was 50 μm or greater and less than 100 μm.
C: The diameter of scratch was less than 50 μm.
D: There was no trace of laser light.

[Evaluation of Chemical Resistance of Separation Layer]

Each separation layer was formed on a bare glass support base using the compositions for forming a separation layer of Examples 6 to 15 in the same manner as in the "Formation of separation layer" described above.

Next, the chemical resistance was evaluated by immersing each separation layer formed on the bare glass support base in N-methyl-2-pyrrolidone (NMP) under conditions of a temperature of 60° C. for 10 minutes.

The chemical resistance was evaluated by performing visual observation. A case where a separation layer formed on the glass support base was not swollen or delaminated was evaluated as "A" and a case where at least one of the swelling and the delamination was found from a separation layer was evaluated as "C". The evaluation results are listed in Tables 5 and 6.

[Evaluation of Hygroscopicity in Separation Layer]

Thermogravimetry-differential heat (TG-DTA) simultaneous measurement was performed on each separation layer formed using the composition for forming a separation layer using a differential thermogravimetric simultaneous measurement device (TG/DTA6200, manufactured by Seiko Instruments Inc.), and a change in weight from 25° C. to 100° C. was confirmed. These results are listed as the "hygroscopicity (%)" in Tables 5 and 6.

A decrease in this hygroscopicity value means that voids due to heat are unlikely to be generated.

[Evaluation of Residual Film Ratio]

The film thickness of each separation layer formed using the composition for forming a separation layer of each example before being baked and after being baked was confirmed. The value obtained by dividing the film thickness thereof after being baked by the film thickness thereof before being baked is listed as the "residual film ratio (%)" in Table 6. The baking here indicates an operation of heating a film obtained by removing the solvent from the coated layer of the composition for forming a separation layer at 260° or 280° C.

An increase in this residual film ratio means that the film thickness after being baked being retained.

TABLE 5

| | | After baking | | | | |
|---|---|---|---|---|---|---|
| | Baking temperature (° C.) | Thickness of separation layer (μm) | Transmittance (%) | Laser scratch diameter (μm) | Laser reactivity | Hygroscopicity (%) |
| Example 6 | 300 | 0.88 | 10.8 | 200< | A | 0.34 |
| | | 0.61 | 21.5 | 200< | A | |
| Example 1 | 300 | 1.86 | 6.9 | 100 | A | 0.69 |
| | | 0.45 | 47.8 | 105 | A | |
| Example 2 | 300 | 1.03 | 11.9 | 129 | A | 1.90 |
| | | 0.68 | 27.3 | 132 | A | |

As shown in the results listed in Table 5, it was confirmed that all separation layers formed using the compositions for forming a separation layer of Examples 1, 2 and 6 exhibited absorbability with respect to light having a wavelength of 532 nm and had photoreactivity.

Further, it was confirmed that the separation layer formed using the composition for forming a separation layer of Example 6 had particularly high photoreactivity, the value of the hygroscopicity of this separation layer was small, and voids due to heat were unlikely to be generated.

As shown in the results listed in Table 6, it was confirmed that all separation layers formed using the compositions for forming a separation layer of Examples 6 to 15 exhibited absorbability with respect to light having a wavelength of 532 nm and had photoreactivity.

In Examples 11 to 15, it was confirmed that the value of hygroscopicity was decreased and voids due to heat were unlikely to be generated in a case where the composition for forming a separation layer whose content ratio of the resin (P-4) occupying the resin component (P) was larger was used. Further, it was also confirmed that the baking temperature can be lowered.

It was confirmed that the separation layers formed using the compositions for forming a separation layer of Examples 10 to 15 had high photoreactivity and improved chemical resistance.

<Production of Laminate>

A bare glass support base (12 inches, thickness of 0.7 mm) was spin-coated with each composition for forming a separation layer of each example, heated under a temperature condition of 100° C. for 300 seconds, further heated under a temperature condition of 150° C. for 300 seconds to remove the solvent, thereby forming a film according to the same method as in the "Formation of separation layer". Next, the formed film was baked under a temperature condition of 300° C. for 20 minutes in an atmospheric environment, thereby forming a separation layer having a thickness of 0.5 μm on the bare glass support base (separation layer formation step).

Further, a semiconductor wafer substrate (12 inches, silicon) was spin-coated with an adhesive composition TZNR (registered trademark)-A4012 (manufactured by TOKYO OHKA KOGYO CO., LTD.) and baked at 90° C., 160° C., and 220° C. respectively for 4 minutes, thereby forming an adhesive layer having a film thickness of 50 μm.

Next, the bare glass support base on which a separation layer had been formed and the semiconductor wafer substrate on which an adhesive layer had been formed were laminated such that the semiconductor wafer substrate, the adhesive layer, the separation layer, and the bare glass support base were stacked in this order and pressed by an

TABLE 6

| | Baking temperature (° C.) | Thickness of separation layer (μm) | Transmittance (%) | Laser scratch diameter (μm) | Laser reactivity | Chemical resistance 60° C./ 10 min NMP | Hygroscopicity (%) | Residual film ratio (%) |
|---|---|---|---|---|---|---|---|---|
| Example 15 | 280 | 0.50 | 40.2 | 80 | B | A | 1.05 | 62.1 |
| Example 6 | 260 | 0.50 | 17.9 | 200< | A | C | 0.40 | 90.3 |
| Example 7 | 260 | 0.50 | 18.2 | 201 | A | C | 0.50 | 89.2 |
| | 280 | 0.50 | 18.1 | 202 | A | C | | 86.3 |
| Example 8 | 260 | 0.50 | 17.5 | 186 | A | C | 0.55 | 87.6 |
| | 280 | 0.50 | 19.2 | 196 | A | C | | 82.3 |
| Example 9 | 260 | 0.50 | 17.7 | 181 | A | C | 0.60 | 84.0 |
| | 280 | 0.50 | 19.7 | 185 | A | C | | 79.5 |
| Example 10 | 260 | 0.50 | 20.3 | 150 | A | A | 0.68 | 81.5 |
| | 280 | 0.50 | 24.5 | 148 | A | A | | 77.1 |
| Example 11 | 260 | 0.50 | 24.0 | 143 | A | A | 0.71 | 77.4 |
| | 280 | 0.50 | 29.7 | 135 | A | A | | 72.8 |
| Example 12 | 260 | 0.50 | 24.7 | 126 | A | A | 0.82 | 79.9 |
| | 280 | 0.50 | 31.4 | 124 | A | A | | 69.0 |
| Example 13 | 260 | 0.50 | 27.5 | 118 | A | A | 0.88 | 73.9 |
| | 280 | 0.50 | 34.4 | 111 | A | A | | 61.8 |
| Example 14 | 260 | 0.50 | 29.7 | 109 | A | A | 0.98 | 70.1 |
| | 280 | 0.50 | 37.2 | 103 | A | A | | 60.6 | adhesive pressure of 4000 kgf (approximately 39.2 kN) under a temperature condition of 215° C. for 2 minutes in a vacuum (5 Pa). In this manner, the bare glass support base and the semiconductor wafer substrate were laminated with the separation layer and the adhesive layer interposed therebetween, thereby obtaining a laminate (lamination step).

After the laminate was obtained, the separation layer was irradiated with laser light having a wavelength of 532 nm under conditions of a scanning speed of 3000 mm/sec, a frequency of 40 kHz, an output (current value) of 24 A, and an irradiation pitch of 140 μm from the support base side of the laminate (separation step).

Thereafter, the adhesive layer was washed and removed using p-menthane (removal step).

It was confirmed that the support base was separated from the semiconductor wafer substrate included in the laminate by performing the above-described operation.

Production Example (1) of Electronic Component

A bare glass support base (12 inches, thickness of 0.7 mm) was spin-coated with each composition for forming a separation layer of each example, heated under a temperature condition of 100° C. for 300 seconds, and further heated under a temperature condition of 150° C. for 300 seconds to remove the solvent, thereby forming a film according to the same method as in the "Formation of separation layer" described above. Next, the formed film was baked under a temperature condition of 300° C. for 20 minutes in an atmospheric environment to form a separation layer having a thickness of 0.5 μm on the bare glass support base, thereby obtaining a support base provided with a separation layer (separation layer formation step).

Thereafter, this separation layer was spin-coated with an adhesive composition TZNR (registered trademark)-A4012 (manufactured by TOKYO OHKA KOGYO CO., LTD.) and baked at 90° C., 160° C., and 220° C. respectively for 4 minutes, thereby forming an adhesive layer having a film thickness of 50 μm.

Next, using a die bonder (manufactured by TRESKY GmbH), a plate of the die bonder was heated at 150° C., and a bare chip made of silicon with a size of 2 mm$^2$ was pressure-bonded onto the adhesive layer by applying a pressure of 35 N for 1 second. The bare chip made of silicon was disposed and heated at 200° C. for 1 hour in a nitrogen atmosphere, thereby obtaining a laminate (lamination step).

The obtained laminate was placed on a plate heated to 50° C., 12 g of a encapsulant containing an epoxy resin was placed so as to cover the bare chip, a pressure of 1 ton was applied to a pressing plate heated to 130° C. under reduced pressure lower than 10 Pa using a bonding device, and the resulting laminate was compressed for 5 minutes. In this manner, the bare chip disposed on the adhesive layer was encapsulated by an encapsulating material, thereby preparing an encapsulated body (encapsulation step).

After the encapsulated body was prepared, the separation layer was irradiated with laser light having a wavelength of 532 nm under conditions of a scanning speed of 3000 mm/sec, a frequency of 40 kHz, an output (current value) of 24 A, and an irradiation pitch of 140 μm from the support base side of the encapsulated body (separation step).

Thereafter, the adhesive layer was washed and removed using p-menthane (removal step).

It was confirmed that the support base was separated from the encapsulated body by performing the above-described operation.

Production Example (2) of Electronic Component

A bare glass support base (12 inches, thickness of 0.7 mm) was spin-coated with the composition for forming a separation layer of Example 15 and heated under a temperature condition of 90° C. for 180 seconds to remove the solvent, thereby forming a film according to the same method as in the "Formation of separation layer" described above. Next, the formed film was baked under a temperature condition of 300° C. for 10 minutes in an atmospheric environment to form a separation layer having a thickness of 0.35 μm on the bare glass support base, thereby obtaining a support base provided with a separation layer (separation layer formation step).

Thereafter, the separation layer was coated with a material for forming a wiring layer (TMMR S2000 (trade name)) and baked under a temperature condition of 90° C. for 3 minutes in an atmospheric environment to form a wiring layer having a thickness of 10 μm on the separation layer, thereby obtaining a laminate.

After the wiring layer was formed, the separation layer was irradiated with laser light having a wavelength of 532 nm under conditions of an irradiation dose of 200 mJ/cm$^2$, an output (current value) of 22 A, and an irradiation pitch of 80 μm from the bare glass support base side of the laminate. Next, the separation layer was immersed in propylene glycol monomethyl ether acetate (PGMEA) as a washing solution and baked under a temperature condition of 90° C. for 5 minutes. Next, the support base was separated from the laminate by repeatedly performing the baking under a temperature condition of 200° C. for 60 minutes in a nitrogen atmosphere three times (separation step).

Thereafter, the surface of the wiring layer on the separation layer side was irradiated with oxygen plasma (power of 2000 W, oxygen flow rate of 2000 sccm, pressure of 75 Pa, temperature of 50° C., and irradiation time of 5 minutes) so that the separation layer adhered to the wiring layer was removed (removal step).

It was confirmed that the support base was separated from the laminate by performing the above-described operation.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: support base
2: separation layer
3: adhesive layer
4: substrate
5: encapsulating material layer
6: rewiring layer
10: laminate
20: encapsulated body
30: laminate
40: electronic component
50: laminate
51: support base
52: separation layer
54: substrate
55: encapsulating material layer 57: wiring layer
60: electronic component

What is claimed is:

1. A composition for forming a separation layer, comprising:
a resin (P2) having a repeating unit represented by general formula (P2):

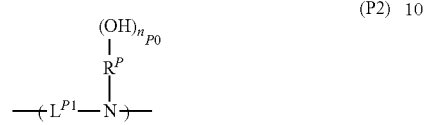
(P2)

wherein $L^{p1}$ represents a divalent linking group; $R^P$ represents an $(n_{P0}+1)$-valent aromatic hydrocarbon group; and $n_{P0}$ represents an integer of 1 to 3.

2. The composition for forming a separation layer according to claim 1, further comprising a thermal acid generator.

3. A support base provided with a separation layer, comprising:
a support base; and
a separation layer formed on the support base, wherein the separation layer is formed of the composition for forming a separation layer according to claim 1.

4. A laminate comprising:
a support base which transmits light;
a substrate; and
a separation layer between the support base and the substrate,
wherein the separation layer is a baked substance of the composition for forming a separation layer according to claim 1.

5. A method of producing a laminate including a support base that transmits light, a substrate, and a separation layer between the support base and the substrate, the method comprising:
forming the separation layer by coating at least one of the substrate and the support base with the composition for forming a separation layer according to claim 1;
baking the composition; and
laminating the substrate and the support base with the separation layer interposed therebetween.

6. The method of producing a laminate according to claim 5, further comprising encapsulating the substrate bonded to the support base with the separation layer interposed therebetween using an encapsulating material to prepare a encapsulated body after laminating the substrate and the support base.

7. The method of producing a laminate according to claim 6, further comprising:
grinding the encapsulating material in the encapsulated body whereby a part of the substrate is exposed after the encapsulating; and
forming a rewiring on the exposed substrate after the grinding.

8. A method of producing an electronic component comprising:
producing a laminate by the method according to claim 5;
separating the support base from the laminate by irradiating the separation layer with light through the support base and modifying the separation layer; and
removing the separation layer adhered to the substrate after separating the support base from the laminate.

* * * * *